(12) United States Patent
Budgett et al.

(10) Patent No.: US 12,506,369 B2
(45) Date of Patent: Dec. 23, 2025

(54) INDUCTIVE POWER AND DATA TRANSFER USING ENERGY INJECTION

(71) Applicant: AUCKLAND UNISERVICES LIMITED, Auckland (NZ)

(72) Inventors: David Mortimer Budgett, Auckland (NZ); Simon Charles Malpas, Auckland (NZ); Dixon Pok Chung Leung, Auckland (NZ); Robert John Gallichan, Auckland (NZ); Bryon Elmer Wright, Auckland (NZ); John Daniel McCormick, Auckland (NZ)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 0 days.

(21) Appl. No.: 17/274,102

(22) PCT Filed: Sep. 6, 2019

(86) PCT No.: PCT/NZ2019/050118
§ 371 (c)(1),
(2) Date: Mar. 5, 2021

(87) PCT Pub. No.: WO2020/050728
PCT Pub. Date: Mar. 12, 2020

(65) Prior Publication Data
US 2021/0359550 A1    Nov. 18, 2021

(30) Foreign Application Priority Data

Sep. 6, 2018 (NZ) ........................................ 745926

(51) Int. Cl.
*H02J 50/80* (2016.01)
*H02J 50/12* (2016.01)
(Continued)

(52) U.S. Cl.
CPC .............. *H02J 50/80* (2016.02); *H02J 50/12* (2016.02); *H03K 5/01* (2013.01); *H03K 7/08* (2013.01);
(Continued)

(58) Field of Classification Search
CPC ....................................................... H02J 50/00
See application file for complete search history.

(56) References Cited

U.S. PATENT DOCUMENTS 5,207,304 A * 5/1993 Lechner .................... B60L 9/00
                                                           191/10
5,701,121 A * 12/1997 Murdoch ............. H04B 5/0081
                                                        340/870.31
(Continued)

FOREIGN PATENT DOCUMENTS

JP    WO-2017082051    *  5/2017    ......... H04B 17/0085
WO    WO-2010030195 A1 *  3/2010    ............. H02J 5/005

OTHER PUBLICATIONS

Cirmirakis, D., et al., A Fast Passive Phase Shift Keying Modulator for Inductively Coupled Implanted Medical Devices, 2012 Proceedings of the Esscirc (ESSCIRC), Bordeaux, France, Sep. 17-21, 2021, pp. 301-304.

(Continued)

*Primary Examiner* — Adi Amrany
(74) *Attorney, Agent, or Firm* — Procopio, Cory, Hargreaves & Savitch LLP

(57) ABSTRACT

A wireless power transfer secondary or pick-up has a resonant circuit and a switch connected to the resonant circuit operable to produce a phase shift in an oscillating voltage or current in the resonant circuit. A controller is configured to operate the switch to introduce one or more (Continued)

controlled phase shifts in the oscillating voltage or current in the resonant circuit which encode data for detection by a coupled circuit.

13 Claims, 18 Drawing Sheets

(51) Int. Cl.
| | |
|---|---|
| *H03K 5/01* | (2006.01) |
| *H03K 7/08* | (2006.01) |
| *H04B 5/26* | (2024.01) |
| *H04B 5/79* | (2024.01) |
| *H03K 5/00* | (2006.01) |

(52) U.S. Cl.
CPC .............. *H04B 5/26* (2024.01); *H04B 5/266* (2024.01); *H04B 5/79* (2024.01); *H03K 2005/00286* (2013.01)

(56) References Cited

U.S. PATENT DOCUMENTS

| | | | | |
|---|---|---|---|---|
| 5,898,579 | A * | 4/1999 | Boys | H02J 3/1807 307/104 |
| 6,301,128 | B1 * | 10/2001 | Jang | H02M 3/33576 363/127 |
| 8,093,745 | B2 * | 1/2012 | Cern | G01R 23/06 340/657 |
| 8,093,758 | B2 * | 1/2012 | Hussmann | H02J 50/12 307/145 |
| 11,387,685 | B2 * | 7/2022 | Pan | H02J 50/80 |
| 2007/0109708 | A1 * | 5/2007 | Hussman | H02J 1/00 361/113 |
| 2007/0194749 | A1 * | 8/2007 | Delanghe | H02J 50/10 320/109 |
| 2009/0302933 | A1 * | 12/2009 | Boys | H02J 50/12 333/174 |
| 2011/0090723 | A1 * | 4/2011 | Hu | H02J 7/025 363/74 |
| 2011/0210620 | A1 * | 9/2011 | Shinoda | H02J 50/10 307/104 |
| 2011/0221277 | A1 * | 9/2011 | Boys | H02J 7/025 307/104 |
| 2011/0221569 | A1 * | 9/2011 | Hamel | A61B 5/0031 340/9.1 |
| 2012/0217111 | A1 * | 8/2012 | Boys | H02J 50/90 191/10 |
| 2013/0062959 | A1 * | 3/2013 | Lee | H02J 50/12 307/104 |
| 2014/0031903 | A1 * | 1/2014 | Mashiach | A61N 1/36125 307/104 |
| 2014/0339903 | A1 * | 11/2014 | Goma | H02J 50/05 307/85 |
| 2014/0346890 | A1 * | 11/2014 | Haseno | H01F 38/14 307/104 |
| 2015/0207333 | A1 * | 7/2015 | Baarman | H02J 50/60 307/104 |
| 2015/0215005 | A1 * | 7/2015 | Toivanen | H04B 5/79 455/41.1 |
| 2015/0244177 | A1 | 8/2015 | Budgett et al. | |
| 2015/0334723 | A1 | 11/2015 | Kim et al. | |
| 2016/0156232 | A1 * | 6/2016 | Joye | H02J 50/10 307/104 |
| 2016/0181818 | A1 * | 6/2016 | Joye | H01F 38/14 307/104 |
| 2017/0040843 | A1 * | 2/2017 | Asanuma | H02J 50/12 |
| 2017/0098957 | A1 * | 4/2017 | Sankar | H04B 5/79 |
| 2017/0118543 | A1 * | 4/2017 | Ha | H04B 5/24 |
| 2017/0164994 | A1 | 6/2017 | Smith | |
| 2017/0324279 | A1 * | 11/2017 | Kang | H02J 50/80 |
| 2018/0198314 | A1 * | 7/2018 | Aisaka | H02J 50/80 |
| 2019/0006885 | A1 * | 1/2019 | Danilovic | H02H 7/1252 |
| 2019/0097459 | A1 * | 3/2019 | Ettes | H04B 5/0031 |
| 2019/0222064 | A1 * | 7/2019 | Du | H02H 3/08 |
| 2020/0169300 | A1 * | 5/2020 | Moon | H04B 5/24 |
| 2020/0186201 | A1 * | 6/2020 | Yousefi | H04B 5/79 |
| 2020/0278716 | A1 * | 9/2020 | Prouet | H04B 5/72 |
| 2021/0138917 | A1 * | 5/2021 | Kanakasabai | G01V 3/101 |
| 2022/0123593 | A1 * | 4/2022 | Nawawi | H01F 38/14 |

OTHER PUBLICATIONS

Gong, C., et al., A Magnetic-Balanced Inductive Link for the Simultaneous Uplink Data and Power Telemetry, Sensors, 17(8), Jun. 11, 2017, 22 pgs.

Gong, C., et al., An NFC on Two-Coil WPT Link for Implantable Biomedical Sensors under Ultra-Weak Coupling, Sensors, 17(6), Jun. 11, 2017, 20 pgs.

Gong, C., et al., A Novel Transcutaneous NFC Uplink System Symbiotic with Inductive Wireless Power Supply under Ultra Low Coupling Coefficient, 2015 IEEE Biomedical Circuits and Systems Conference (BioCAS) Oct. 22-24, 2015, 4 pgs.

Jiang, D., et al., An Integrated Passive Phase-Shift Keying Modulator for Biomedical Implants with Power Telemetry over a Single Inductive Link, IEEE Transactions on Biomedical Circuits and Systems 11(1), Feb. 2017, pp. 64-77.

Kim, H-J., et al., Review of Near-Field Wireless Power and Communication for Biomedical Applications, IEEE Access, vol. 5, Sep. 27, 2017, pp. 21264-21285.

Lu, Z., et al., An 8 Mbps Data Rate Transmission by Inductive Link Dedicated to Implantable Devices, 2008 IEEE International Symposium on Circuits and Systems, May 18-21, 2008, Seattle, WA, pp. 3057-3060.

Simard, G., et al., High-Speed OQPSK and Efficient Power Transfer Through Inductive Link for Biomedical Implants, IEEE Transactions on Biomedical Circuits and Systems, 4(3), Jun. 2010, pp. 192-200.

Tian, J., et al., A Current-Fed Energy Injection Power Converter for Wireless Power Transfer Applications, IECON 2013—39th Annual Conference of the IEEE Industrial Electronics Society, Nov. 10-13, 2013, Vienna, Austria, pp. 222-227.

International Preliminary Report on Patentability for related PCT App No. PCT/NZ2019/050118 dated Mar. 9, 2021, 8 pgs.

* cited by examiner

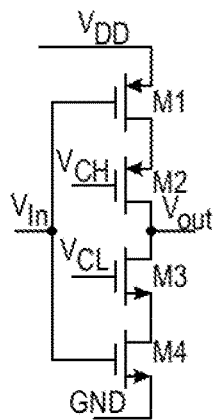 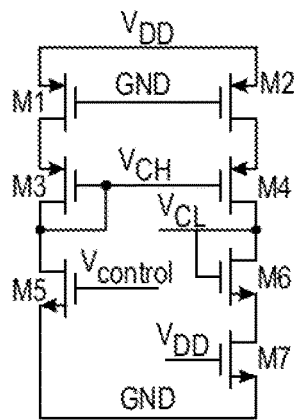 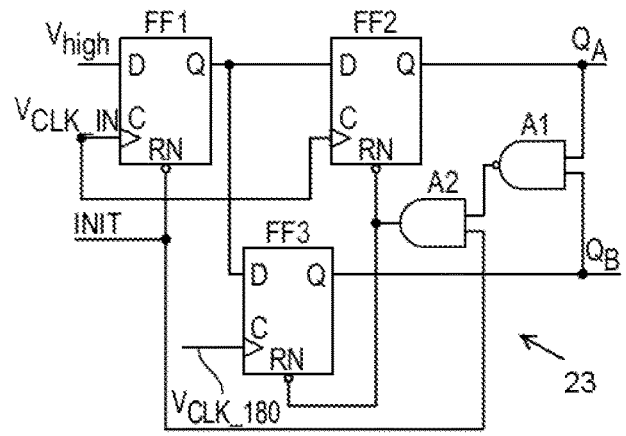
FIG. 19A  FIG. 19B  FIG. 19C
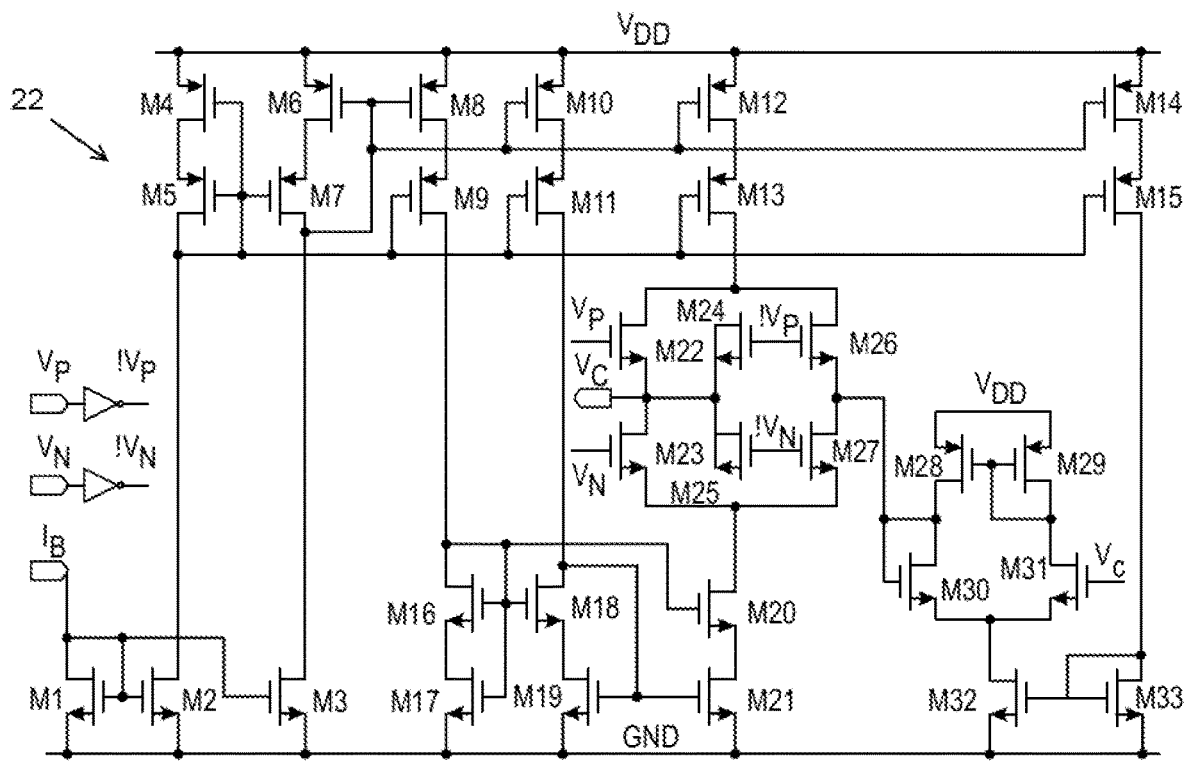
FIG. 20

INDUCTIVE POWER AND DATA TRANSFER USING ENERGY INJECTION

FIELD OF INVENTION

This invention relates to inductive power transfer (IPT) systems (also known as wireless power transfer (WPT) systems), and has particular relevance to data and (wireless) power transfer, and to operation of IPT system primary power supplies. More particularly, the invention relates to a system and methods for transferring data from a wireless power transfer secondary or pick-up to a wireless power transfer primary using phase shift keying generated using energy injection and phase shifting.

The invention may find application in a number of other fields and applications, one of which is wearable devices, particularly implantable devices.

BACKGROUND

Inductive power transfer (IPT), a form of wireless power transfer (WPT), uses inductors to transfer power across air gaps or though skin without physical contacts. An alternating current in a primary inductor generates a time varying magnetic field. Current is induced in a secondary inductor situated within the time varying magnetic field. This current can be used to power an electrical circuit. Typically a resonant capacitor is included in series or parallel with each inductor to cancel the reactance at the desired operating frequency.

Over the last decade, Inductive Power Transfer (IPT) technology has been increasingly utilised in numerous industrial and consumer applications that require wireless power transfer, mainly due to its ability to provide high levels of power transfer, in a safe, reliable and convenient manner. IPT enables the operation of many implantable medical devices that are space limited or require long-term power draws that are too large for batteries to be appropriate. Such applications include neural recording, neural stimulation, optogenetics, cardiac pressure monitoring, intraocular pressure monitoring and intracranial pressure monitoring.

In addition to power, data can be transferred across an inductive link by various means. Load modulation/load shift keying (LSK) has been used in RFID and wireless power applications for many years to transfer data from the secondary to the primary. Data is transferred from the secondary to the primary by modulating the load on the secondary side of the IPT link. Changes in load are detected as an amplitude modulation of the voltage on the primary inductor. LSK requires strong coupling between the secondary and primary for amplitude changes at the primary to be detectable. This is not the case for small implantable devices deep within the body. Furthermore, LSK techniques typically use a switch in parallel with a parallel-tuned secondary-pickup 2 that is shorted and opened to change the reflected load seen by the primary-coil L1. Therefore a main drawback of LSK is the limited data rate with high quality-factor (Q) pickups and the disruption to power transfer while the LSK switch is closed.

Passive phase shift keying (PPSK) has been used to transfer data at higher data rates with similar detectability to LSK. PPSK has the same limitations as LSK and is the modulation at the primary is only detectable with strong coupling between the primary and secondary. Impulse radio (IR) methods transfer power and data at separate time intervals. A known implementation of an IR method can be seen in FIG. 1. In IR-based methods, sharp impulses applied to the secondary coil L2 using IR Modulator 4 are used to induce decaying oscillations detectable at the primary 1 by amplifier 5 and IR Demodulator 3. Therefore, the data rate is limited by inter-symbol interference (ISI) due to the decaying oscillations which is largely determent by the implant coil time constant $\tau=2L_2/R_2$ which is equivalent to $\tau=2Q_2/\omega$. To achieve high data rates with a desired secondary Q, high carrier frequencies need to be used which may limit the maximum specific absorption rate (SAR) constrained power transferred to the implant. To address this drawback of IR-based techniques, pulse harmonic modulation (PHM) techniques have also been employed which could suppress the ringing and increase data rate by applying carefully timed pulses to the secondary coil. However, the pulses use additional power and their timing and amplitude are sensitive to coupling between the primary and secondary coil L2.

As IR-based methods are typically a form of AM modulation and use non-coherent demodulation methods such as envelope detection, phase based modulation schemes have been implemented. These phase-based modulation schemes can be detected with lower probability of error compared to amplitude modulation for the same energy per bit at the receiver. However, the difficulty of shifting phase in resonant inductive pickups due to the large amount of stored energy in the resonant inductor and capacitor has prevented methods such as binary-PSK (BPSK) from being adopted. Changing the phase may take a number of resonant cycles and each phase change requires energy equal to $E=1/(C_2V_2^2)$ to bring the resonant voltage to zero and re-start resonance at the new phase.

Passive phase-shift-keying (PPSK) and cyclic-on-off-keying (COOK) has also been used. In this method, a wireless power primary and secondary which are tuned to 2 MHz and data modulated at 125 KHz on top of the power carrier using a power amplifier at the secondary have been selected. The frequency separation between the power carrier and uplink data signal allowed the power carrier to be filtered out at the primary and the data carrier to be detected. However, this PSK and COOK method presents the same trade-off as LSK where high Q pickups which are desirable for power transfer significantly filter out the data carrier which is not at the resonance frequency. Frequency shift keying (FSK) has also been used for RFID applications. IR and FSK methods also have similar disadvantages as with the LSK.

The present invention is directed to overcoming one or more of the problems set forth above by providing an improved circuit topology to address some of the drawbacks found in previously developed IPT systems.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

OBJECTS OF INVENTION

It is an object of the invention to provide a converter which will at least go some way to overcoming disadvantages of existing systems, or which will at least provide a useful alternative to existing systems.

Further objects of the invention will become apparent from the following description.

SUMMARY OF INVENTION

Accordingly, in one aspect the invention may broadly be said to consist in a wireless power transfer pick-up comprising:
- a resonant circuit comprising a pick-up coil element and a tuning element
- a switch connected to the resonant circuit and operable to produce a phase shift in an oscillating voltage or current in the resonant circuit
- a controller configured to operate the switch to introduce a series of controlled phase shifts in the oscillating voltage or current in the resonant circuit which encode data for detection by a coupled circuit.

Preferably, the coupled circuit is a wireless power transfer primary circuit.

Preferably, the phase shifts are used to transmit data in the form of binary phase shift keying (BPSK), quadrature phase shift keying (QPSK) or any arbitrary number of phase shifts.

Preferably, the switch connected to the resonant circuit is further configured to operate for a fraction of the resonant cycle or multiple resonant cycles.

Preferably, the controller is further configured to inject energy in the wireless power transfer pick-up.

Preferably, the injected energy is configured to maintain an amplitude of the oscillating voltage/current in the resonant circuit.

Preferably, the controller is configured to operate the switch when not receiving power from a magnetic field.

Preferably, the injected energy maintains oscillations in the pick-up.

Preferably, the controller is configured to detect a weakly coupled primary.

In another aspect the invention may broadly be said to consist in a method of controlling a wireless power transfer pick-up having a switched resonant circuit, comprising:
- creating a phase shift in an oscillating voltage or current in the switched resonant circuit;
- controlling the switch to introduce a series of controlled phase shifts in the oscillating voltage or current in the resonant circuit which encode data for detection by a wireless power transfer primary circuit.

In yet another aspect the invention may broadly be said to consist in a wireless power transfer system comprising:
- a wireless power transfer pick-up comprising a switched resonant circuit operable to produce a phase shift in an oscillating voltage or current in the switched resonant circuit; and
- a wireless power transfer primary circuit comprising a detection means for detecting the phase shifts in the oscillating voltage or current in the switched resonant circuit.

Preferably, the detection means is configured to decode data.

In a further aspect the invention may broadly be said to consist in a method of operating a wireless power transfer system comprising:
- creating a phase shift in an oscillating voltage or current in a switched resonant circuit of a wireless power transfer pick-up; and
- detecting the phase shifts in the oscillating voltage or current in the switched resonant circuit by a detection means provided in a wireless power transfer primary circuit.

Preferably, the controller may control the energy transfer between each source to optimise the operation (efficiency and power transfer) of the converter.

The controller may control the duty cycle.

In another aspect the invention may broadly be said to consist in.

In one embodiment the coupled AC energy sources provide isolation.

In an embodiment the wireless power transfer apparatus further comprises means for determining an error by comparing the value of a parameter of the system with a required value, and the means for determining an energy injection switching pattern is arranged to determine the duration dependent on the error.

In an embodiment the duration comprises a pattern length having a number of cycles of the resonant frequency of the circuit, and wherein the pattern comprises a number and/or distribution of energy injection events in the injection switching patterns is dependent on the parameter value, the energy injection events being dependent on the resonant frequency cycles.

In one embodiment, there is provided a switch or a switching system that applies pulsed energy in phase with the ringing in the secondary resonant tank to maintain the ringing at a desired amplitude.

In yet another aspect the present invention broadly describes an apparatus for wirelessly communicating between a pickup and receiver, and the apparatus comprising: an inductor, an arbitrary resonant tuning network, a switch in parallel with the inductor and an arbitrary driving circuit used as a means of generating and maintaining an oscillating voltage and current within the pickup, wherein phase shifts are introduced by short circuiting the inductor at the maximum current, zero voltage crossing for a fraction (or multiple whole periods and a fraction) of the resonant period wherein the fraction of the resonant period determines the size of the phase shift and phase shifts encode data.

The phase shift is used to transmit data in the form of binary phase shift keying (BPSK), quadrature phase shift keying (QPSK) or any arbitrary number of phase shifts is used.

The driver circuit is not used and the phase shifts are introduced to the decaying oscillations in the resonant pickup after power has been introduced wirelessly from an external power transmitter.

The driving circuit is an energy injection system whereby the resonant pickup is allowed to freely oscillate and energy is injected when the amplitude of the oscillations fall below set threshold.

The driver circuit is supplied by energy from the voltage stored on a capacitor, the voltage stored on a super capacitor, a battery or a secondary wireless power pickup.

In yet another aspect the present invention also broadly discloses an apparatus for wirelessly communicating between a pickup and receiver comprising an inductor, a capacitor and an arbitrary resonant tuning network, a switch in series with the capacitor and an arbitrary driving circuit used as a means of generating and maintaining an oscillating voltage and current within the pickup, wherein phase shifts are introduced by open circuiting the capacitor at the maximum voltage, zero current crossing for a fraction (or multiple whole periods and a fraction) of the resonant period wherein the fraction of the resonant period determines the size of the phase shift and phase shifts encode data.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Other aspects of the invention may become apparent from the following description which is given by way of example only and with reference to the accompanying drawings.

DRAWING DESCRIPTION

A number of embodiments of the invention will now be described by way of example with reference to the drawings as follows.

Figure 10:
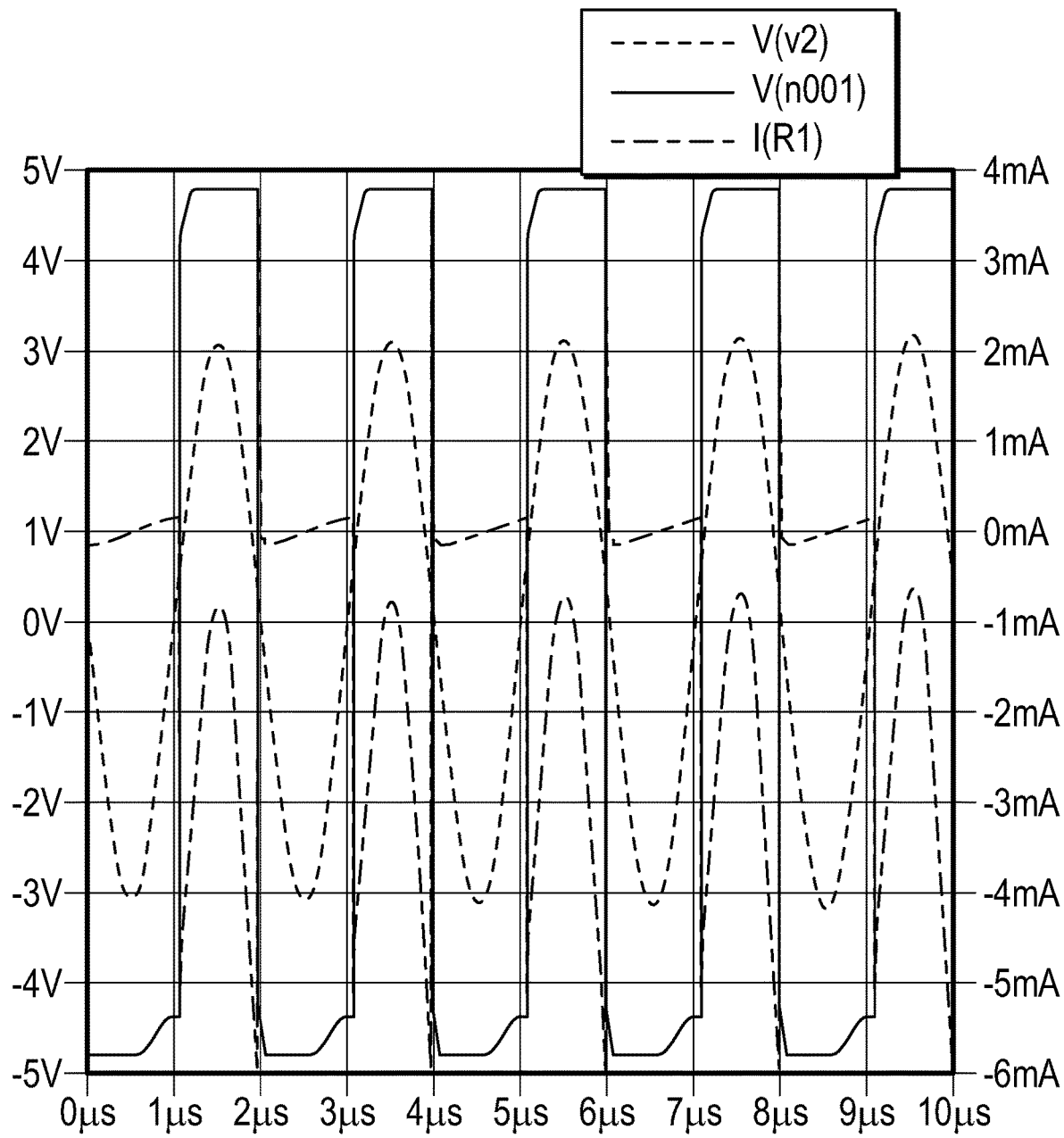
Figure 11:
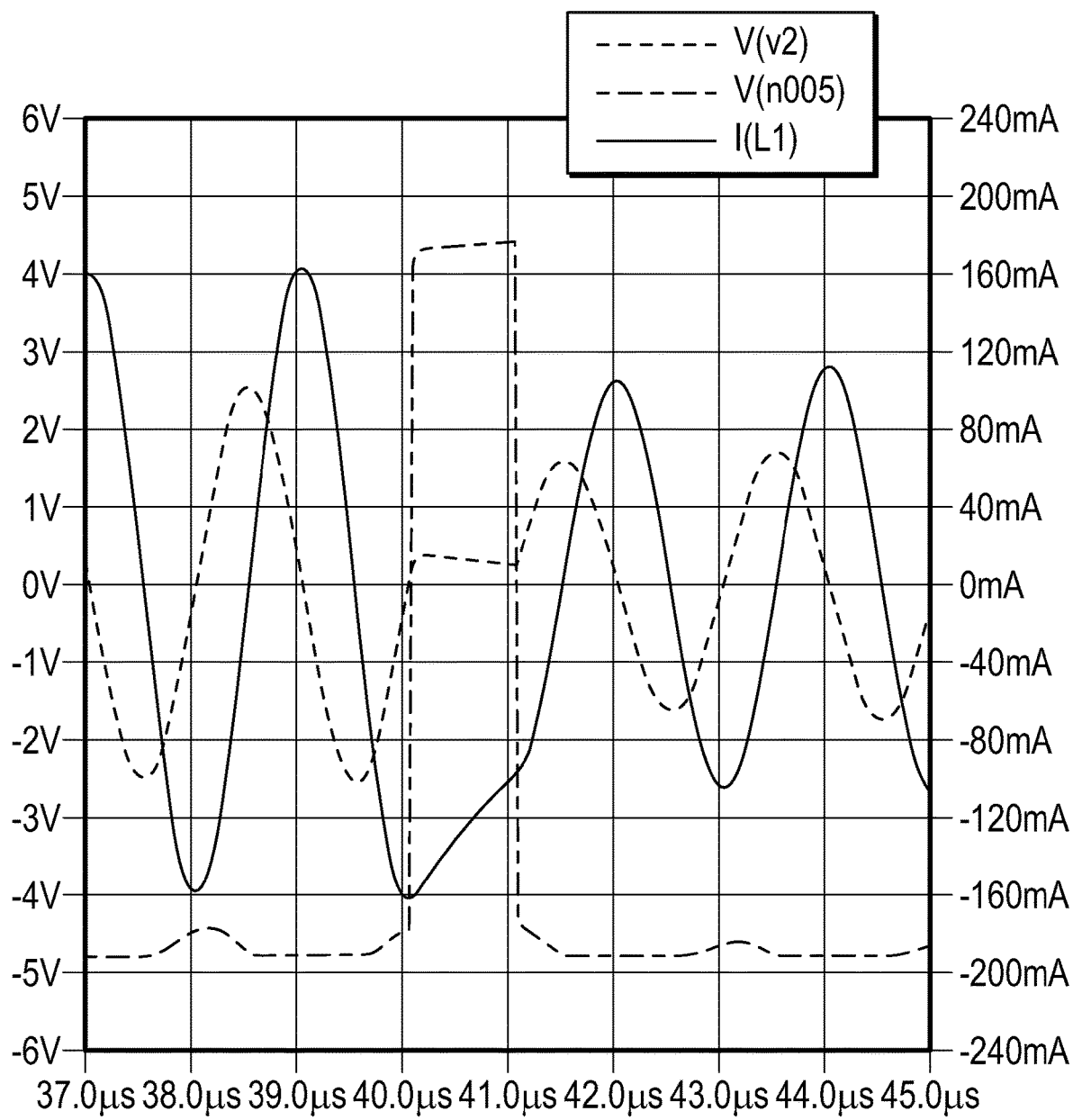

FIG. 10 depicts the waveforms of the driving circuit, where the blue waveform is the pick-up voltage, green is Zero voltage crossing detector output, and the red waveform representing the driving current, FIG. 11 depicts the waveforms of the phase shifter, where the blue waveform is the pick-up voltage, green is pick-up current, and the red waveform representing the phase shifter driving circuit output.

Figure 12:
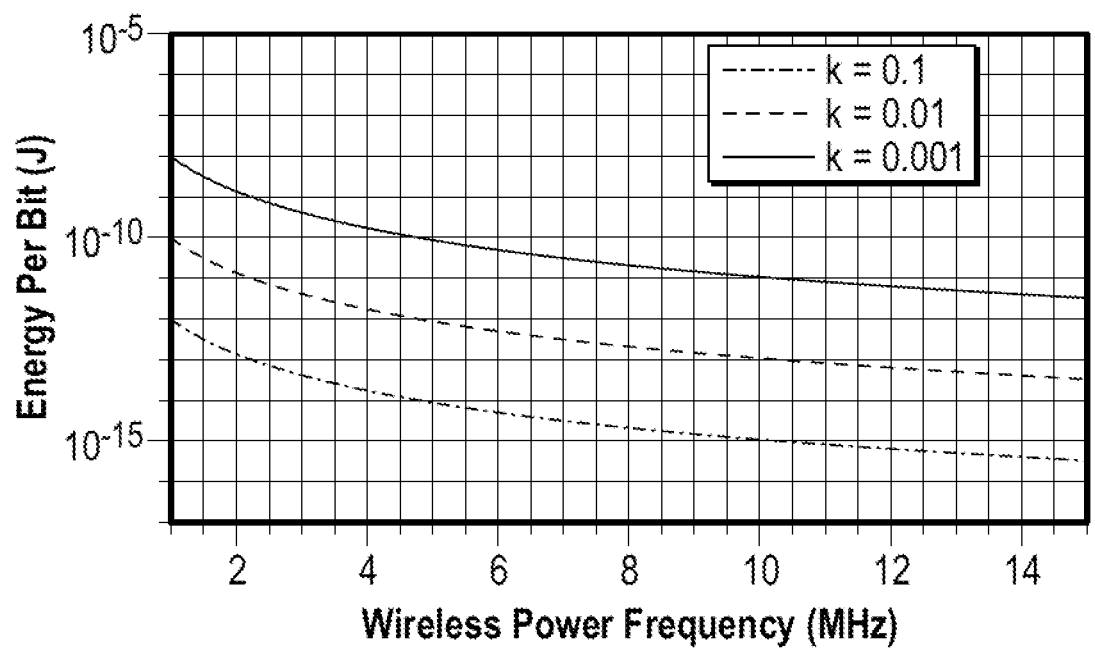

FIG. 12 depicts a graph showing energy per bit required at secondary to produce 100 μV at the primary against frequency for a range of couplings given a primary and secondary coil parameters: $L_2$=2.25 uH, $R_2$=2.5 Ohm, and $L_1$=200 nH and using 10 carrier cycles per bit.

Figure 13:
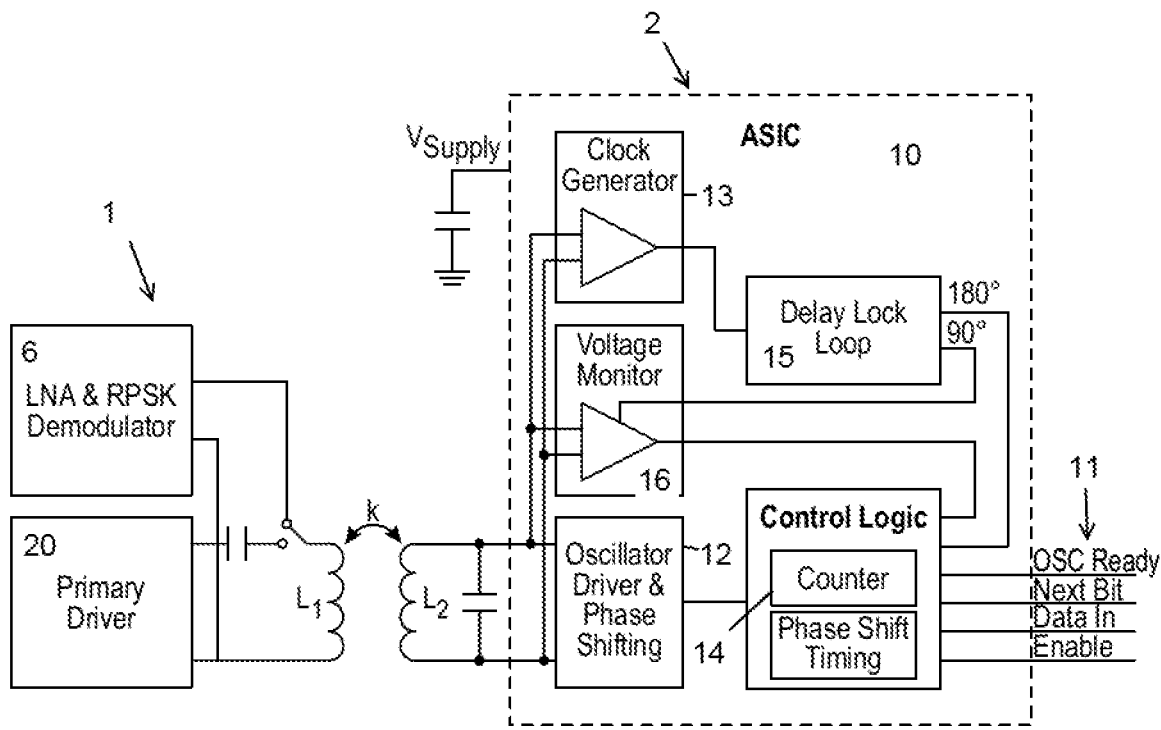

FIG. 13 depicts an example implementation of the RPSK ASIC system architecture (also known as sequential RPSK) with right hand pins of the ASIC connecting to a microcontroller.

Figure 14:
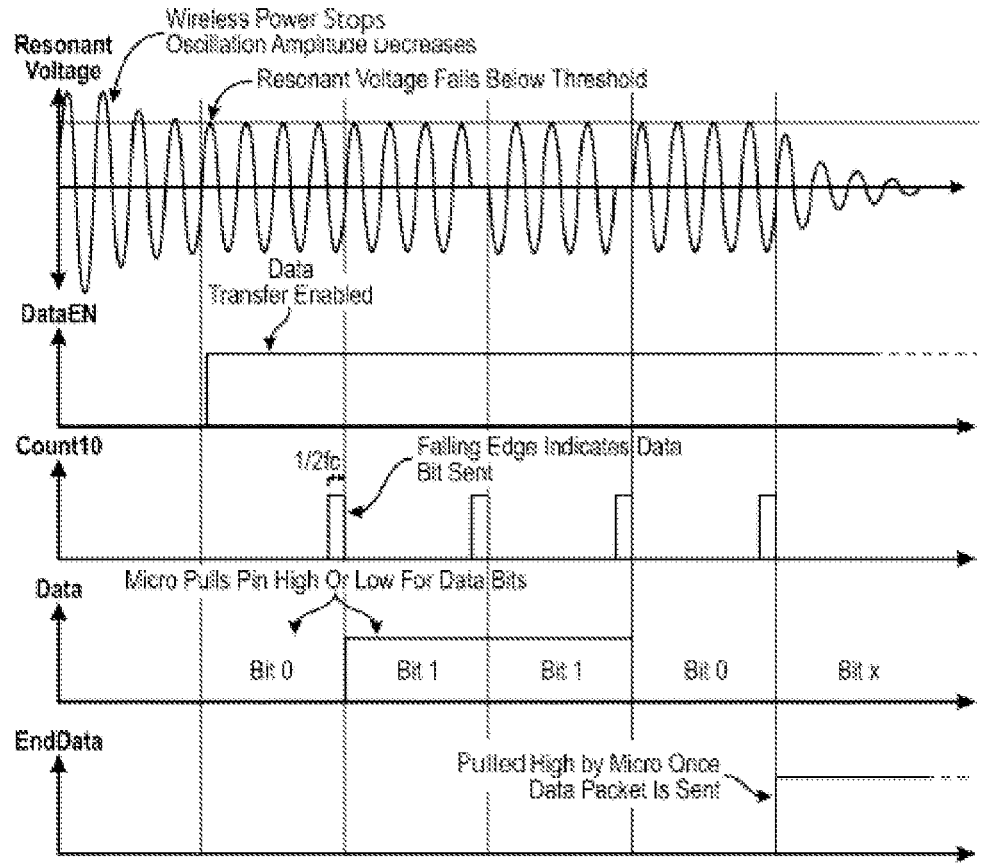

FIG. 14 depicts an instance of a data transfer sequence with RPSK of four carrier cycles per bit for clarity is shown.

Figure 15:
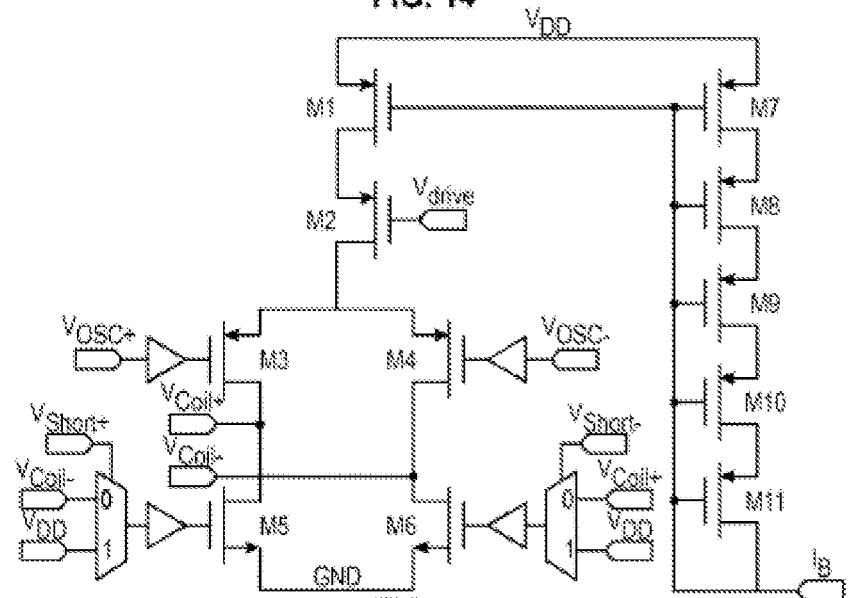

FIG. 15 depicts an example implementation of the RPSK ASIC oscillator driver and phase shifting circuit.

Figure 16:
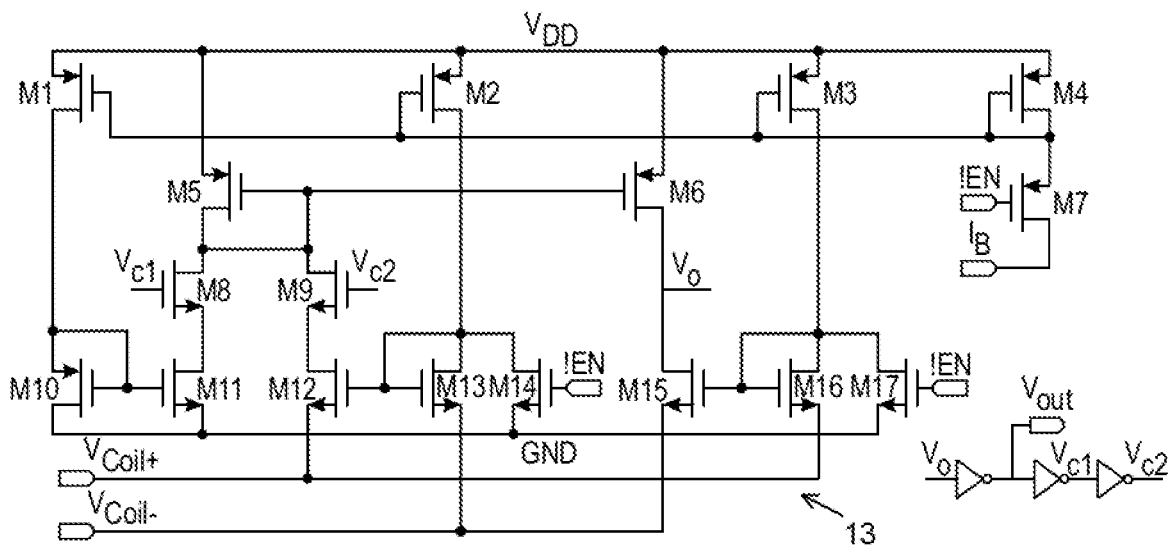

FIG. 16 depicts an example implementation of the ASIC clock recovery circuit.

Figure 17:
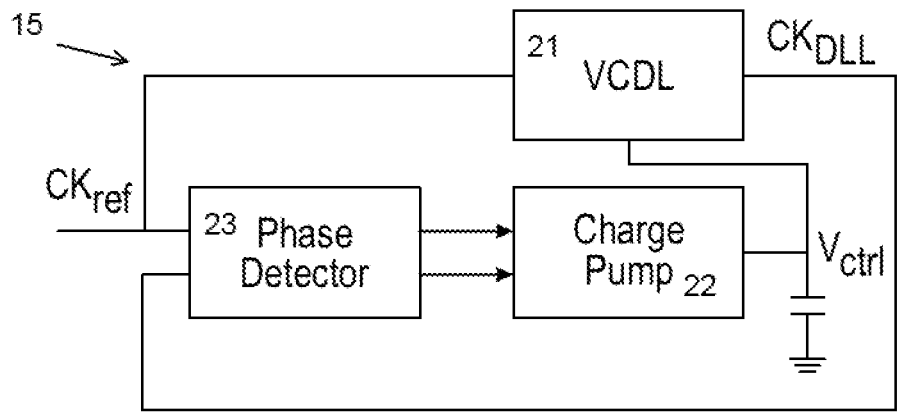

FIG. 17 is a block diagram depicting an example implementation of a delay-lock-loop (DLL).

Figure 18:
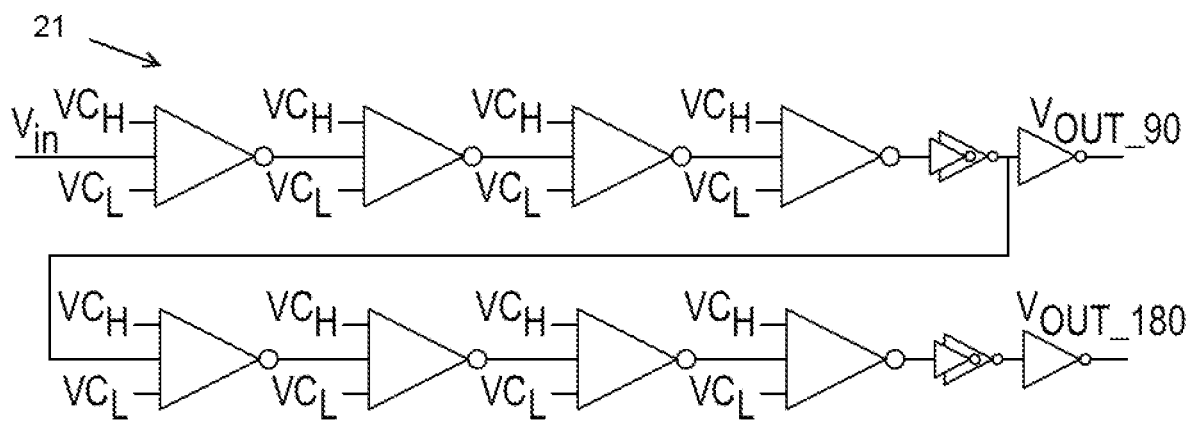

FIG. 18 depicts an example implementation of VCDL structure consisting of two identical branches in series.

FIGS. 19a-19c depict (a) a current starved inverter as delay element for VCDL, (b) a bias circuit to generate control current from control voltage, and (c) a phase detector.

FIG. 20 depicts an example implementation of a charge pump for the DLL.

Figure 21:
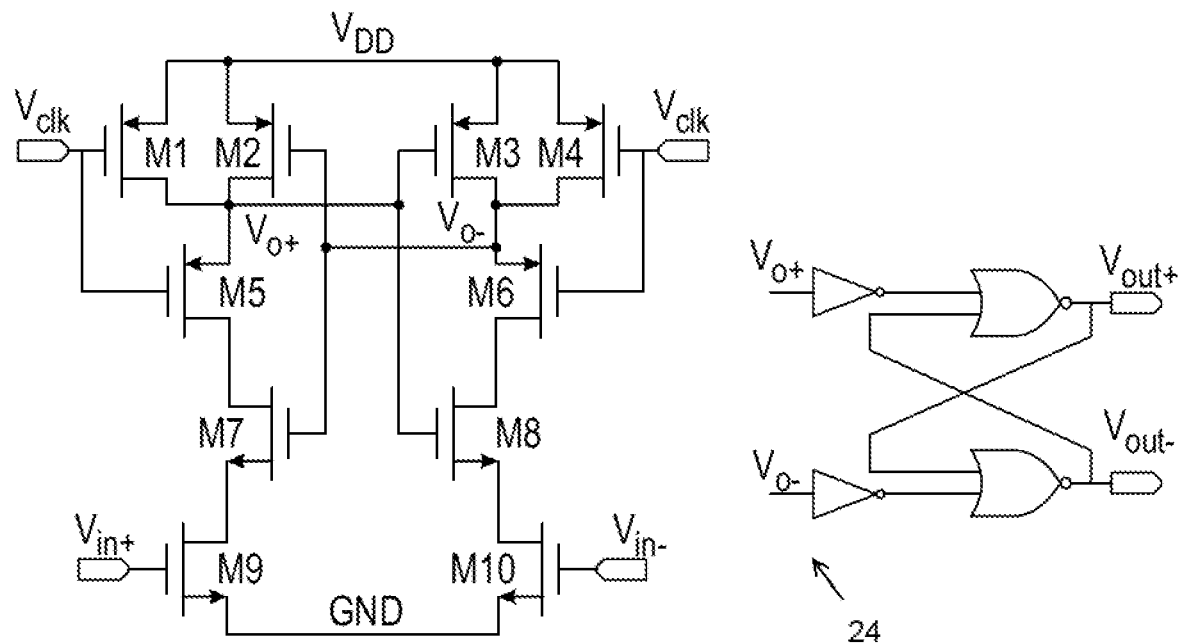

FIG. 21 depicts an instance of a voltage monitor using a low kickback regenerative latch.

Figure 22:
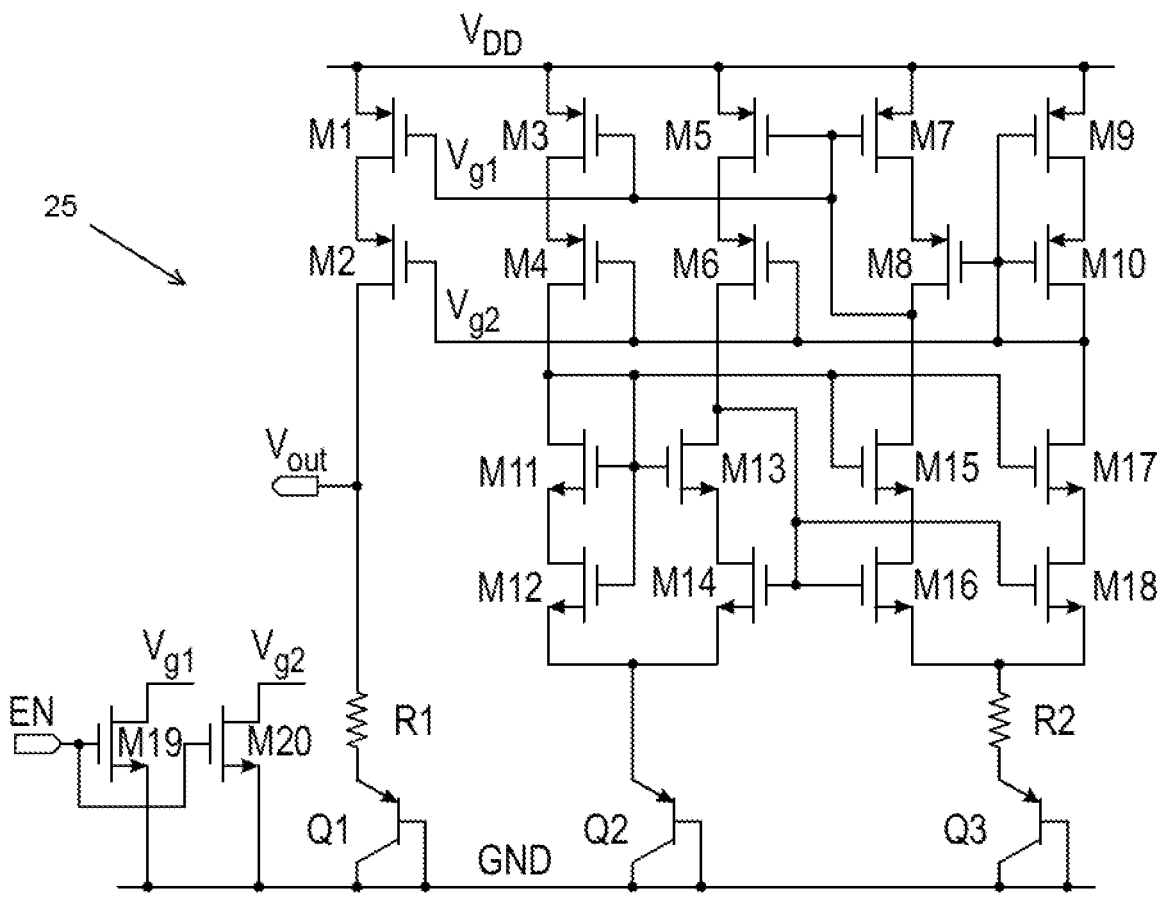

FIG. 22 depicts an example of the bandgap voltage reference for on-chip bias voltages and currents.

Figure 22A:
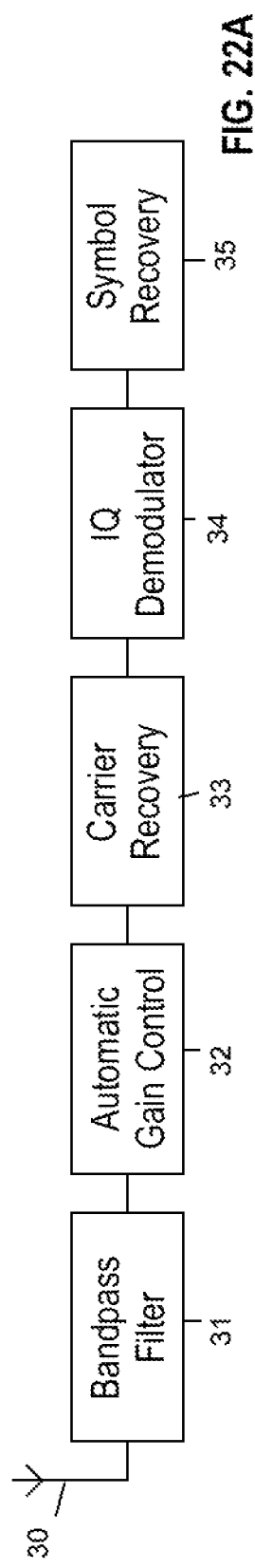
Figure 23:
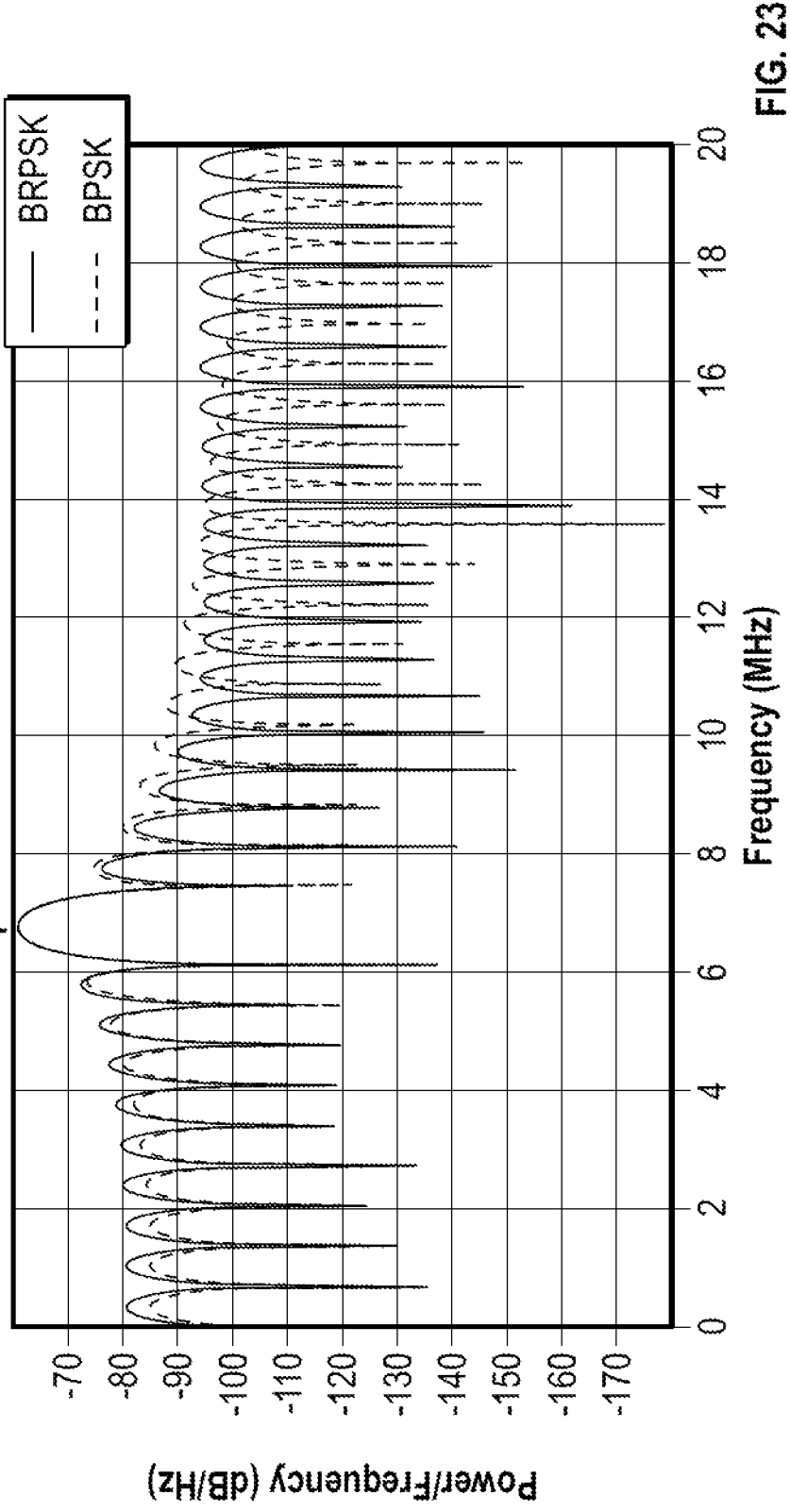

FIG. 22a is a block diagram depicting an example implementation of a BPSK receiver, FIG. 23 graphically illustrates the power spectral densities of a BPSK and BRPSK signal using a carrier frequency of 6.78 MHz and symbol rate of 678 KHz.

Figure 24:
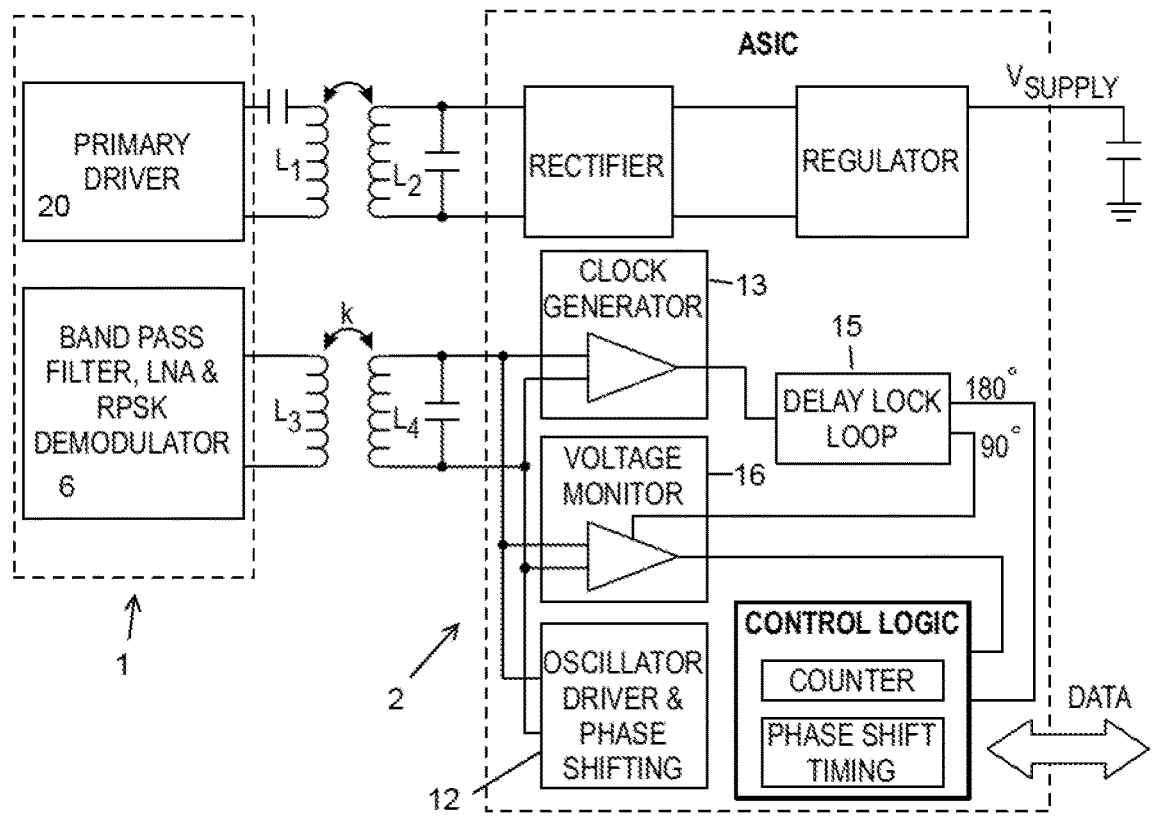

FIG. 24 depicts another example implementation of the RPSK ASIC system architecture using multiple coils (Multi-coil RPSK).

Figure 25:
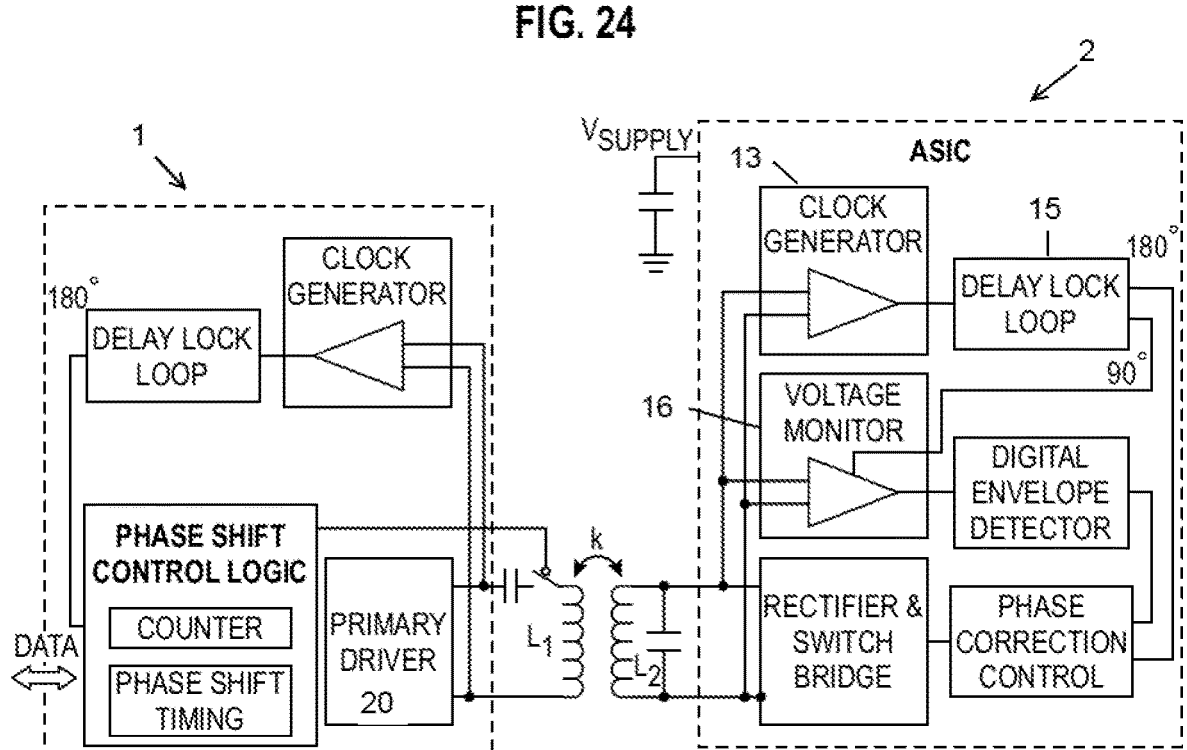

FIG. 25 depicts an implementation of downlink RPSK ASIC system architecture that is configured to send and receive data and energy between the primary and the secondary of the system.

DESCRIPTION OF ONE OR MORE PREFERRED EMBODIMENTS

Wireless power transfer (WPT) though inductive coupling is now a central technology for multiple commercially available devices, including for example wearable devices and implantable devices such as glucose monitors, ICP monitors and cochlear implants. It is also seen as a key enabler for new methods of monitoring, diagnosing and treating a range of medical conditions such treating Parkinson's with optogenetics and monitoring compartmental pressure within the body. The success of many applications currently under research hinges upon improvements in data transfer methods. Although this specification refers to examples comprising implantable devices (i.e. implantable in a living animal), it has applications outside these fields.

Small or very small implantable devices offer huge potential for patient monitoring and early, timely therapeutic intervention. To perform sensing functions like pressure measurement, it is necessary for the implanted device to send data out of the body. For chronic use, tiny devices have challenges getting enough electrical power and using wireless power transfer is a sensible strategy. The current invention relates to the ability to send data out from the implanted device making use of the same wireless infrastructure hardware used to send power in. It has distinct advantages through the use of existing components (helps with miniaturisation) and enabling a greater amount of data to be transferred in a given time frame compared to other data transfer systems combined with wireless power transfer systems.

There are existing implantable devices, such as neurostimulators, that use a separate radio frequency link for data transfer and use a wireless power link for recharging a battery. This has good data transfer performance, but is bulky in size which impacts on surgical placement procedures and risk of infection (the battery may also require surgical replacement from time to time). Others use the wireless power transfer link for both power and data transfer. However, current methods require moderate coupling between the external wireless power unit and the implant for data transfer from the implant to the external power unit to be reliable.

Consequently, the current invention discloses a novel method and apparatus for transferring data from a wireless power transfer secondary to a wireless power transfer primary using inductive phase shift keying (IPSK) generated using energy injection and phase shifting via shorting of a resonant inductor. Another embodiment of the invention discloses a novel method and an apparatus for resonant-phase-shift-keying (RPSK) for sequential uplink data transfer using phase-shift-keying (PSK) over a single inductive link. Examples of applications of the present invention include devices for intracranial pressure monitoring, cardiac pressure monitoring, and bladder pressure monitoring, neural recording, optogenetic stimulation which may all benefit from the use of phase shift keying (PSK) techniques for wireless power transfer. Furthermore, one of the advantages of the proposed IPSK and RPSK techniques is allowing data to be transferred from very small deeply implanted devices to an external reader without a separate radio frequency link and under very weak coupling conditions.

IPSK—Implementation and Advantages

According to an embodiment, to transmit data, the wireless power carrier is turned off and oscillations on the secondary resonant pickup are maintained by an oscillator. Providing the secondary pickup has a high Q, oscillations can be maintained with only minor power consumption. Data bits are transmitted by short circuiting the parallel tuned pickup at zero voltage crossings and holding the short for precisely half of the carrier cycle before being released. This introduces a 180 degree phase shift without disrupting the energy stored in the resonant pickup. In contrast to PPSK, because the primary is turned off during data transfer, the phase shift at the secondary can be detected at the primary as BPSK using coherent demodulation.

Figure 1:
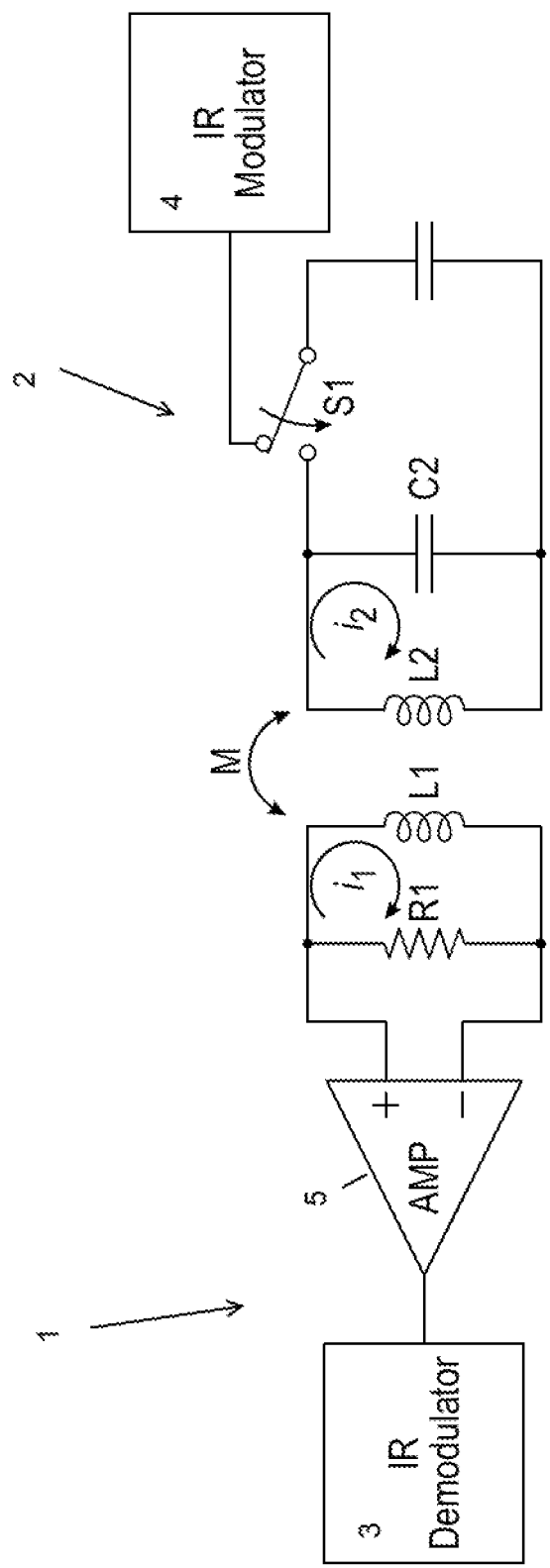
FIG. 1 is a circuit diagram showing the typical topology of a IR technique used in the prior art.
Figure 2:
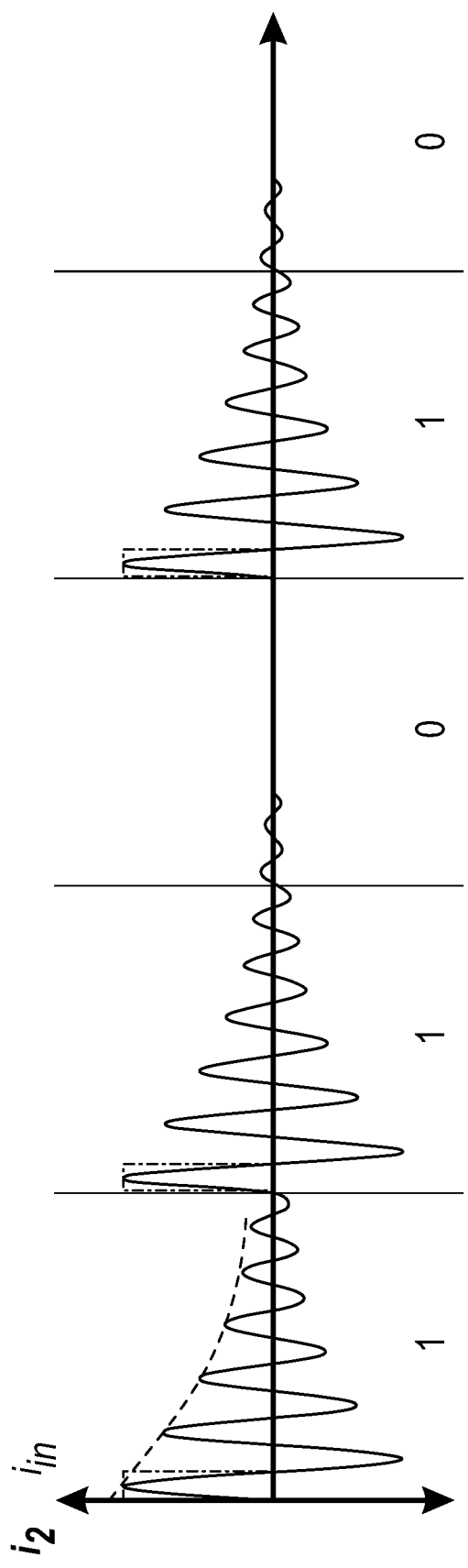
FIG. 2 depicts an energy injection technique using a sinusoidal voltage generated in the secondary wireless-power-transfer pickup

In the current invention, a sinusoidal voltage (as seen in FIG. 2) is generated in the secondary wireless-power-transfer pickup. This can be achieved through any method but the preferred implementation is using energy injection. The resonant voltage is monitored and when it falls below a threshold energy is injected via briefly connecting the pickup to a charged capacitor though a resistor. When the resonant voltage is above the threshold, the pickup is allowed to freely oscillate.

Data is transferred though shifting the resonant voltage phase. This is achieved by short circuiting the pickup inductor at maximum current and zero voltage. The pickup is shorted for a fraction of the resonant frequency, 50% for binary phase shift keying. The energy in the pickup is maintained as a constant current though the inductor allowing the phase to be shifted without significant energy loss.

PSK modulation is preferable to amplitude shift keying (ASK) and frequency shift keying (FSK) due to its fundamentally better immunity to noise. The probability of error in detecting a received data bit in the presence of additive white Gaussian noise for ASK and FSK is $P_e = Q(\sqrt{E_b/N_0})$ where $E_b$ the signal energy per bit, $N_0/2$ the noise spectral density and Q is the Q-function commonly used in communication systems theory. The probability of error for PSK is $P_e = Q(\sqrt{2E_b/N_0})$ which is inherently lower for the same energy per bit. The use of IPSK allows PSK modulated data to be generated without dissipating significant additional energy during phase change. In addition, the data rate is independent of the pickup quality factor allowing high rate data over an inductive link that is optimised for power transfer. IPSK allows large amounts of data to be efficiently transferred across an inductive link. This enables IPSK to be used with only a capacitor as an energy storage element and avoids the use of batteries. With the exception of the inductive pickup and energy storage capacitor all components of the IPSK modulator can be integrated onto an integrated circuit leading to a very small implantable device.

IPSK—Advantages Over Other Load Shift Keying (LSK) Techniques

Data transfer via LSK has to main disadvantages as below:
1) The data rate is limited by the quality factor of the system. A high quality factor is desired to maximise power transfer in a WPT system. However, a high Q also decreases the bandwidth for LSK systems limiting the data-rate.
2) Data and power are transferred simultaneously using LSK.

A change in load at the secondary creates a change in load at the primary. The change in load at the primary is proportional to the change in load at the secondary but gets smaller with the square of the coupling. With very low coupling between the primary coil and secondary coil, the load shift used in LSK cannot be detected as it is orders of magnitude smaller than the secondary coils load.

On the contrary, inductive phase shift keying (IPSK) can be run while power transfer at the primary is off and hence an induced voltage is detected rather than a change in load. The change in voltage is small but there is no interference from a driven voltage at the primary. Using coil shorting for phase shifting, the data rate of IPSK is independent of the secondary Q. If the primary coil is disconnected from the resonant capacitor, IPSK is also independent of the primary pickup Q allowing much larger data rates. An embodiment of the current IPSK technique is also configured of stop the power transfer and await data. In other words, the circuit can goes into a message receptor mode until it receives information on the data. The circuit is also configured to resume power transfer after receiving the data. This can also be periodic or intermittent based on the timing suggested in the data.

IPSK—Advantages Over Passive Phase Shift Keying (PPSK):

Two main disadvantages of PPSK are:
1) Data and power are transferred simultaneously using PPSK. PPSK uses a switch to short the secondary inductor for a half carrier cycle resulting in a 180° phase shift in the secondary voltage,
2) 2) In PPSK, each phase change requires a number of carrier cycles for the out of phase voltage to be reduced to zero and then brought back up to the original ringing voltage that depends on the coupling coefficient and the secondary quality factor. The data rate for IPSK is independent of Q and coupling coefficient.

The phase shift in the secondary voltage causes the secondary ringing to be 180° out of phase with the primary driving voltage. The voltage induced at the primary from the secondary is now seen as a 2× change in amplitude on top of the primary driven voltage and can be detected as an amplitude change. Similar to LSK, when the WPT link has low coupling the voltage is very hard to detect on top of the driven voltage in the primary. IPSK generates a phase shift in the primary the same way but transfers data as a phase shift rather than an amplitude change which is only practical while the primary is not transferring power.

IPSK—Advantages Over Impulse Radio (IR) and FSK Techniques

IR is an amplitude modulated communication method and has two main disadvantages.
1) As discussed above, the probability of error in detecting a revived data bit in the presence of additive white Gaussian noise is $P_e=Q(\sqrt{E_b/N_0})$ where $E_b$ the signal energy per bit, $N_0/2$ is the noise spectral density and Q is the Q-function commonly used in communication systems theory. The probability of error for PSK is $$P_e = Q\left(\sqrt{\frac{2E_b}{N_0}}\right)$$

which is inherently lower for the same energy per bit.
2) The data rate of IR depends on the quality factor of the secondary pickup.

This data rate depends on the decay rate of the ringing induced in the pickup by the impulse. Larger data rates lead to increased ISI and hence increased probability of error. Techniques can be used to actively cancel the ringing but at the cost of additional power required per bit without increasing the signal energy per bit (more energy required with no benefit to probability of error). IPSK data rate is independent of Q factor.

Advantages Over Frequency Shift Keying (FSK) Methods:
Two main disadvantages of FSK are:
1) A FSK signal detected using coherent detection has a probability of error given by $P_e=Q(\sqrt{E_b/N_0})$. This is worse than the probability of error of PSK.
2) FSK requires a change in resonance frequency of the secondary pickup. This can be achieved by changing the inductance or capacitance of the resonant tank.

Ether of these methods require additional passive components not required by IPSK. A capacitor could be integrated into an ASIC but would require additional die area which could be a significant cost. A switch would be required between the additional capacitor and resonant capacitor decreasing Q and increasing power loss.

PSK generally has the following key advantages:
1. Detectable at very low couplings.
2. Best probability of error compared with FSK and ASK/IR.
3. Larger data rate compared with IR and data rate is independent of Q.

Inductive phase shift keying with inductive shorted phase shifting allows PSK to be implemented with the following advantages:
1. Simple and low power modulation method. A switch is opened and closed to inject energy into the resonant tank to maintain ringing in the tank. No power amplifier or other RF circuitry is required.
2. Energy in resonant tank is maintained during phase shift. The inductor is shorted at zero voltage/maximum current for half a carrier or increments of half a carrier cycle+full carrier cycles. The energy in the inductor is maintained. Shifting phase buy adding energy would require addition of energy equal to twice what is stored in the tank to reduce the ringing to zero and then increase it back to the same amplitude at a different phase.
3. IPSK could use binary PSK, quadrature PSK or any other number of phases simply by shorting the secondary pickup inductor for different increments of the carrier frequency,
4. PSK could extend the range and increases the data rate in many wireless power applications characterised by very weakly coupled links and limited energy storage such as batteries. IPSK could also enable passive RFID tags with greater transmit distance.

As such, a number of features disclosed herein provide an improved method or circuit topology for transferring data from a wireless power transfer secondary to a wireless power transfer primary using inductive phase shift keying generated using energy injection and phase shifting.

Figure 3:
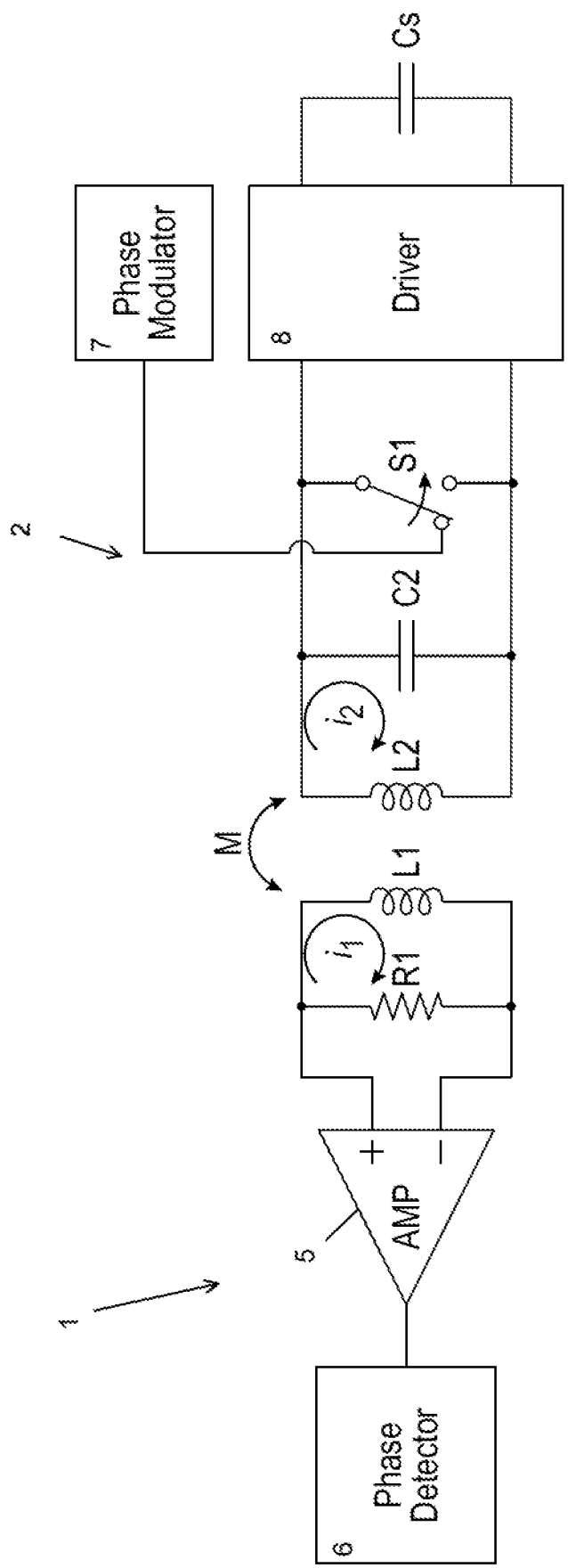
FIG. 3 depicts a circuit diagram of an embodiment of the IPSK technique with parallel tuned pickup.

With reference to the drawings, FIG. 3 illustrates in schematic form the preferred embodiment of an inductive phase shift keying system. The system includes 1) a secondary side inductive pickup 2 comprising an inductor (L2) and a capacitor (C2) tuned to resonate at the inductive power transfer resonant frequency 2) a driving circuit 8 (Driver) to maintain an oscillating voltage in the secondary pickup at or close to the secondary pickup resonant frequency 3) a switch (S1) used to short circuit the secondary inductive pickup 4) a phase shifting circuit 7 (phase modulator) used to control the switch and short circuiting of the inductive pickup in order to introduce phase shifts into the oscillating voltage for the purpose of transferring data 5) a primary inductor (L1) and resistor (R1) used to generate a voltage from the magnetic field produced by the secondary pickup 6) an amplifier 5 (ideally, an operational amplifier—indicated by the label Amp in FIG. 3) to amplify the received data to a detectable level 7) a phase detection circuit 6 (phase detector) to determine the phase of the signal and output binary digital data.

The current in the primary side is denoted by $i_1$ and the current in the secondary side denoted by $i_2$. The mutual inductance is depicted by the label M.

Figure 4:
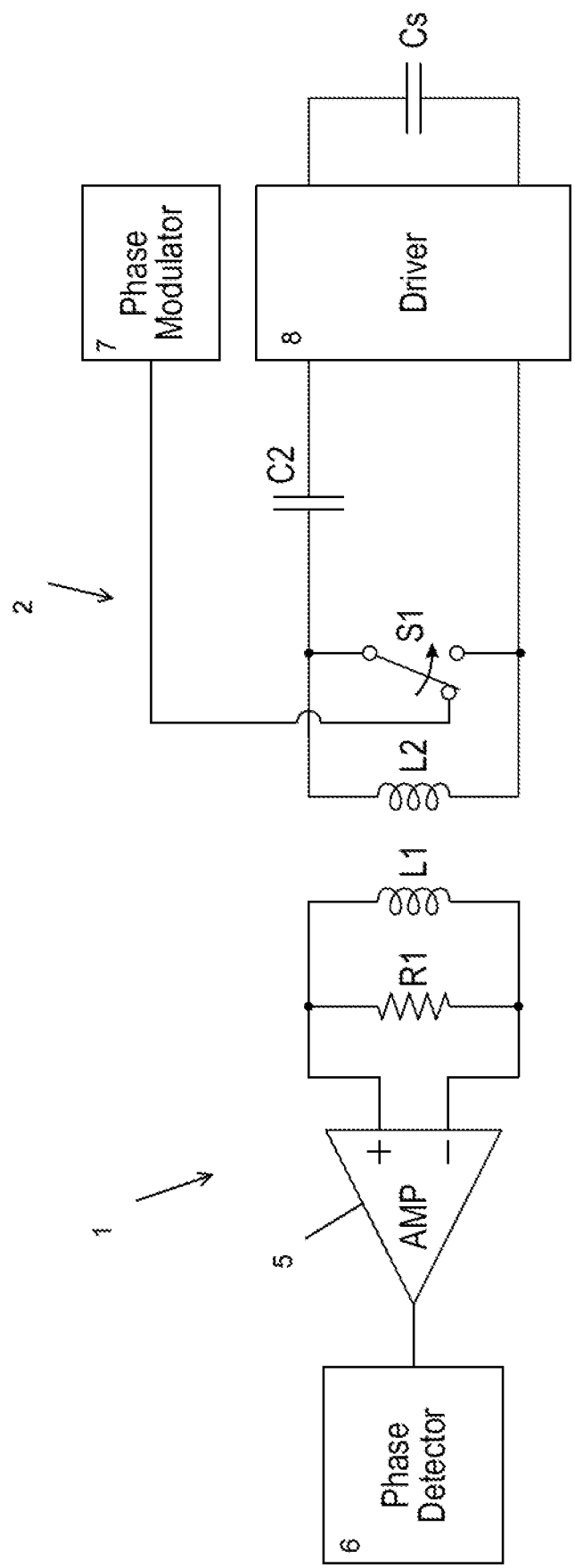
FIG. 4 depicts a circuit diagram of an embodiment of the IPSK technique with series tuned pickup.
Figure 5:
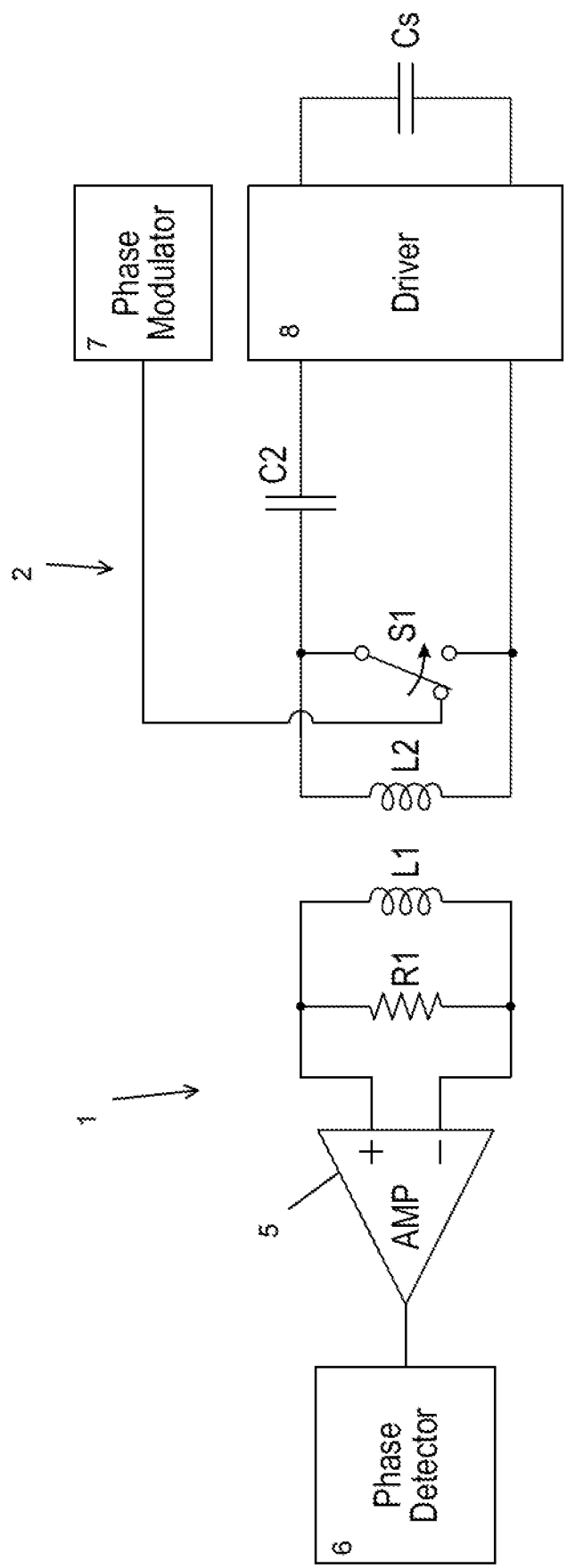
FIG. 5 depicts a circuit diagram of an embodiment of the IPSK technique with arbitrary tuning network.

IPSK can be implemented with both parallel tuned and series tuned pickups 2 as shown in FIGS. 3 and 4. The principal of zero voltage, maximum current switching remains the same. IPSK can be extended to an arbitrarily tuned pickup with any combination of series and parallel tuning components as in FIG. 5. The difference is that a tuning network is arranged in place of the capacitor (C2) in FIGS. 3 and 4. The phase shifting circuit (phase modulator) in these embodiments is configured to operate the switch to introduce a series of controlled phase shifts in the oscillating voltage or current in the resonant circuit which encode data for detection by a coupled circuit. According to one embodiment, the coupled circuit could be a wireless power transfer primary circuit.

The current IPSK circuit is also configured to detect a weakly coupled circuit. Weak coupling in this context means that the changes at the secondary circuit cannot be detected/observable at the primary circuit while power is being transferred from the primary to the secondary. The common load-shift-keying technique typically works with couplings factor of 0.1. The weak coupling/ultra-low coupling is defined at a coupling factor of 0.01. Essentially, it can be understood that weak coupling is observable when the secondary pickup coil is an order of magnitude smaller than the gap between the secondary and primary pickup coils.

The primary circuit uses energy injection to add power, the need to do this is based on the energy available on the secondary. Energy injection in this case refers to keeping the ringing going at the secondary side to allow a longer period of time where phase shifts might be introduced to support communication. Energy injection could also be used to maintain the amplitude of the oscillating voltage/current in the secondary resonant circuit.

Fraction of resonant cycle: This is the resonant cycle of the resonant circuit. Closing the phase shifting switch for half a cycle will lead to a 180 degree phase shift. Closing for a quarter of a cycle will lead to a 90 degree phase shift.

Figure 6:
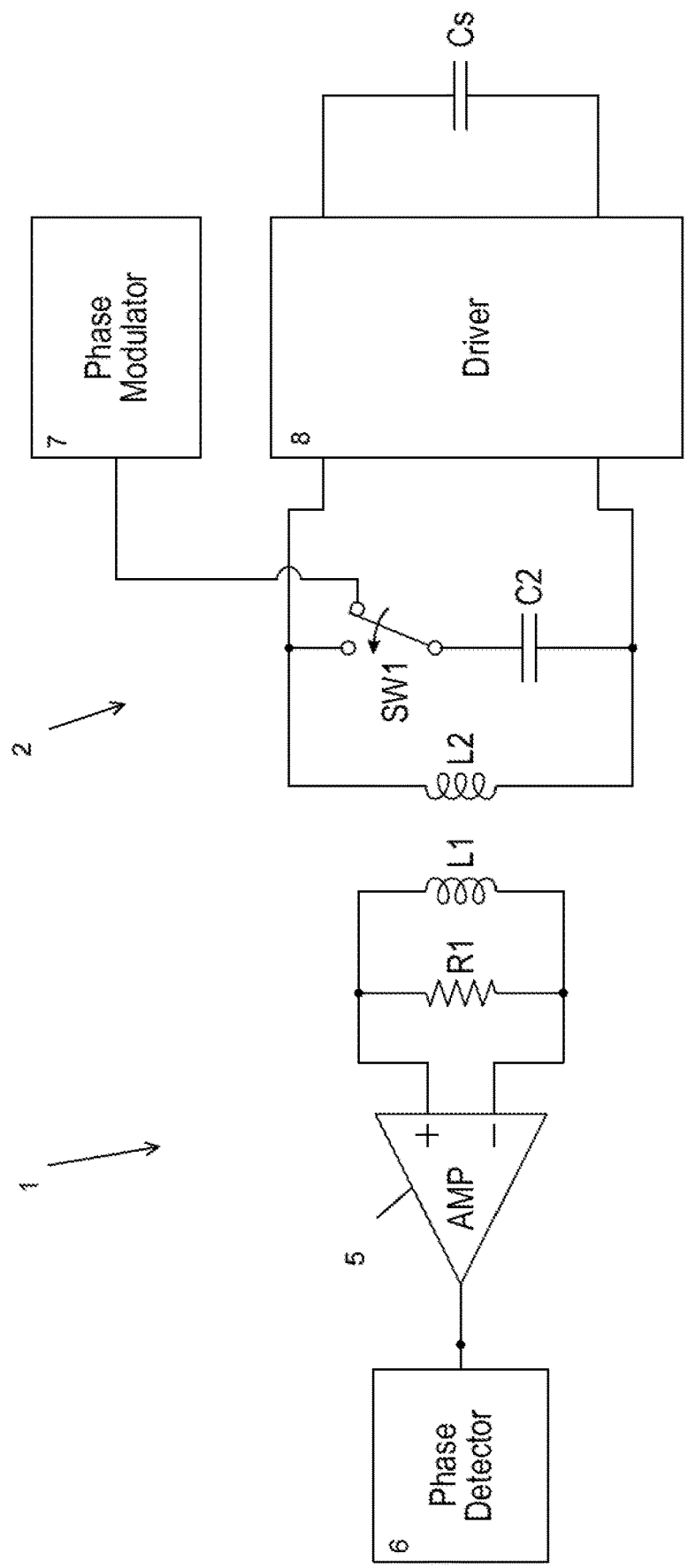
FIG. 6 depicts a circuit diagram of an embodiment of the IPSK technique with capacitance based phase shift.

A variant of IPSK referred to as capacitive phase shift keying (CPSK) can also be implemented as shown in FIG. 6. CPSK is similar to IPSK. The switch is normally closed. When a phase shift needs to be introduced the switch is opened at zero current, maximum voltage. The voltage is stored on the capacitor for a fraction of the resonant period before the switch is reclosed. The benefit of this CPSK is that zero energy is lost during the phase shift. However, a switch with non-zero resistance will be in the resonant current pathway leading to power loss during normal operation.

Figure 7:
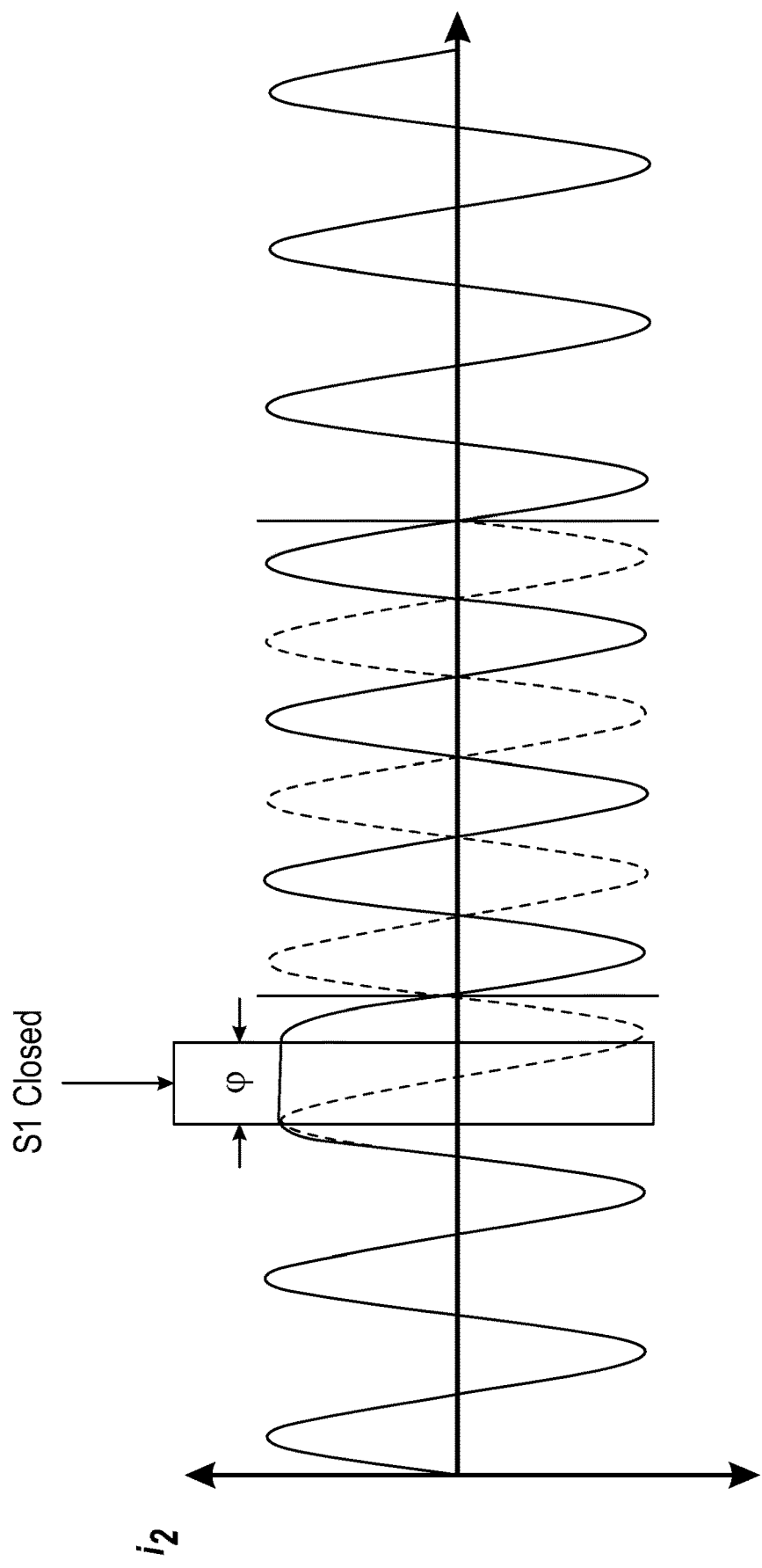
FIG. 7 illustrates a phase shift being introduced in the IPSK system short circuiting the pickup.

FIG. 7 illustrates the ideal oscillating voltage in the secondary pickup. In an ideal, lossless system the current in the secondary pickup would continue to oscillate maintaining a constant amplitude. Binary information is encoded into the oscillating current by short circuiting the pickup at the maximum current, zero voltage crossing. The switch remains closed for a fraction of the resonant period. For binary phase shift keying the switch remains closed for 50% of the resonant period introducing a 180 degree phase shift. As the system is lossless, the current remains constant and zero energy is lost in the phase shift.

Figure 8:
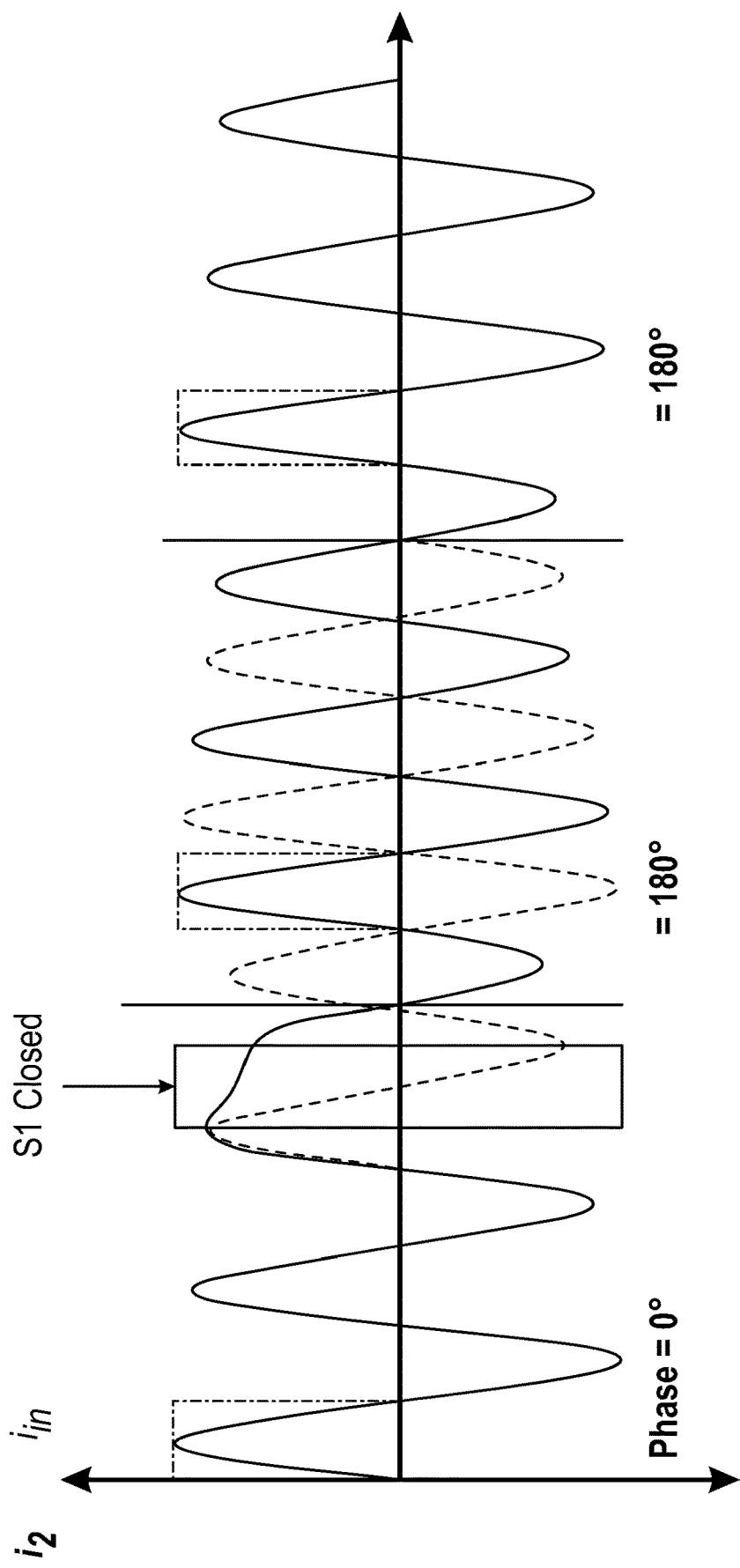
FIG. 8 illustrates the resistive losses in the IPSK system of the current invention.

In a practical system resistive losses are present. The resistive losses are dominated by the series resistance in the secondary inductor and the series resistance of the shorting switch. Resistive losses decrease the oscillation amplitude with time and decrease the inductor current during shorting. Additional energy is added to the pickup to maintain the oscillating current as illustrated in FIG. 8. Energy can be added to the system in many ways, in the preferred implementation energy is injected in the form of a current pulse $i_{in}$ when the oscillations drop below a threshold voltage.

Simulation Results

Figure 9:
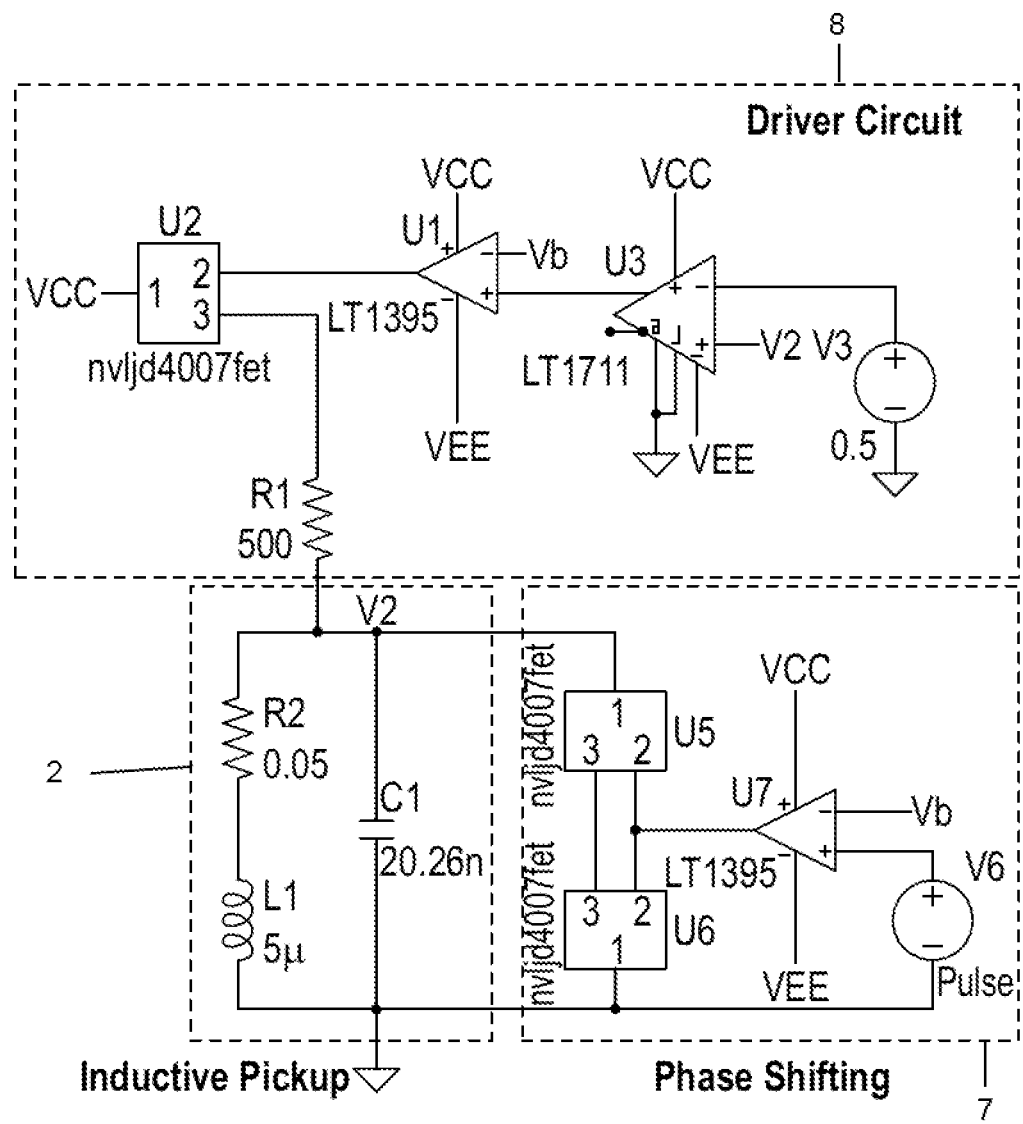
FIG. 9 depicts a circuit diagram showing the topology of an embodiment of the IPSK system of the present invention.

An inductive phase shift keying circuit can be implemented with a driving circuit and a phase shifting circuit as in FIG. 9. According to one embodiment, the circuit is made up of three main components, an inductive pickup circuit, a phase shifting circuit, and a driver circuit. The driving circuit creates an oscillating current in the inductive pickup at the pickup resonant frequency or close to the pickup resonant frequency. The oscillating current though the pickup inductor creates a magnetic field which can be detected by an external inductive pickup.

Data/information is added to the oscillating current by shifting its phase. The voltage V2 in a LC resonant circuit (pickup) is zero when the current is maximum and the voltage is maximum when the current is zero. The phase shifter short circuits the inductor at zero voltage, maximum current for a fraction of the resonant period. When shorted for half the resonant period data is encoded as binary phase shift keying. Providing the switches U5 and U6 have low resistance, the current in the inductor remains constant and the energy stored in the current is preserved.

Driver Circuit

The implementation in FIG. 9 drives the pickup at its resonant frequency with a half bridge driver. Zero voltage crossings are detected when V2 is greater than ground using the comparator U3. A buffer U1 is used to drive the transistor U2 switching it on as shown by the green trace in FIG. 10. The supply VCC is connected to the pickup though a current limiting resistor R1 (red trace I(R1)). The additional energy added to the pickup maintains oscillations in the pickup (blue trace V(v2)).

Phase Shifter

To send data and introduce a phase shift, the voltage at V6 goes positive at the zero voltage crossing of V2. U7 drives the transistors U5 and U6 turning them on and short circuiting the pickup as seen in the red trace of FIG. 11. V6 remains positive for half of the pickup resonant period. V6 drops back to 0V turning the transistors off and allowing the pickup to continue resonating with a 180 degree phase shift. Most of the pickup current (Green trace) is preserved but a drops is visible during shorting due to the resistance of the transistors.

Therefore, through the above simulation results it was shown that, not only did the proposed system have the ability to transfer the data at very low coupling conditions, it also provided a higher data rate than offered by other IR techniques with lower power, which is lacking in existing direct WPT systems.

As such, the current invention proposes a new form of control for IPT systems, or IPT primary power supplies, in which discrete energy injection is used to control the primary power controller and thus control the IPT system as required. In particular, energy injection according to the present invention allows the power available to one or more pick-ups.

It has been presented that the amount of energy induced can be varied as required though any combination of pulse duration, amplitude and frequency. The ringing can be maintained without the presence of an external magnetic field and the phase of the ringing can be changed arbitrarily by short circuiting the pickup inductor at zero voltage/maximum current for an increment of a carrier cycle and any number of full carrier cycles. Finally, it was also disclosed that the change in phase results in no loss of energy stored in the resonant tank other than the losses in the coil resistance and shorting switch resistance.

A method of controlling a wireless power transfer pick-up having a switched resonant circuit, comprising, creating a phase shift in an oscillating voltage or current in the switched resonant circuit; and controlling the switch to introduce a series of controlled phase shifts in the oscillating voltage or current in the resonant circuit which encode data for detection by a wireless power transfer primary circuit has also been presented.

Also presented is a wireless power transfer system comprising a wireless power transfer pick-up comprising, a switched resonant circuit operable to produce a phase shift in an oscillating voltage or current in the switched resonant circuit; and a wireless power transfer primary circuit comprising a detection means for detecting the phase shifts in the oscillating voltage or current in the switched resonant circuit (FIGS. 3-6). The embodiments of this invention are effective at providing an increased uplink data transmission rate from the implanted secondary to the external primary and has use in brain machine interface and neural recording applications that have high data throughput requirements Resonant Phase Shift Keying (RPSK) Implementation and Advantages RPSK is a method of transferring data from a wireless power transfer primary to a wireless power transfer secondary using phase-shift-keying generated though precisely timed shorting of the resonant pickup inductor at zero-voltage crossings or open-circuiting of the resonant pickup capacitor at maximum voltage crossings. Essentially, RPSK is a sequential data transfer method consisting of two phases where power transfer and uplink data are separated in time. A simplified model of RPSK with supply capacitor Cs, oscillator, phase modulator, amplifier at primary and phase detector can be described with reference to FIG. 3.

With reference to FIG. 3, oscillations are driven on the secondary resonant coil to create a carrier. Provided the secondary has a high Q factor, very little power is required to maintain oscillation at a constant amplitude. Typically, it is inefficient to shift the phase in an IPT pickup as the energy stored in the resonant tank is lost during the phase shift and more energy must be added to re-establish oscillations at the new phase. This energy loss can be avoided by using precisely timed shorting of $L_2$ at the zero voltage crossings for half a carrier cycle. In a parallel LC pickup, the current and voltage are in quadrature. During zero voltage crossings, current is at its maximum. When $L_2$ is shorted, current is held constant for half a carrier cycle and when the switch is re-opened oscillation continues at the new phase. Provided the inductor has a high Q and the switch has low ESR the time constant is long compared to oscillation frequency and current flowing though the inductor and switch is only reduced fractionally during the half cycle of shorting. This presents a highly efficient method of producing phase shifted data from a high Q wireless power link. In contrast to LSK. PPSK and IR based methods, the data rate is independent of the pickup quality factor. In addition, a higher secondary Q results in more efficient driving of the oscillations and less energy lost during phase shifts.

In an embodiment, a sinusoidal voltage (FIG. 2) is generated in the primary coil of a wireless-power-transfer pickup for the purpose of power transfer to a secondary pickup. During normal operation in a wireless power transfer system with the primary and secondary tuned to resonance, the secondary voltage is in phase with the primary current. By open-circuiting the series tuned primary pickup or short-circuiting the parallel tuned primary pickup for half of the resonance cycle the phase of the primary current is flipped 180 degrees and is placed out of phase with the secondary voltage. This takes power out of the secondary which can be seen as a decrease in resonant voltage at the secondary. The decrease in resonant voltage is greater than what would be seen from simply turning off the primary coil. The secondary resonant voltage amplitude is monitored. When a voltage drop greater than possible from turning off the primary alone is detected on the secondary coil it is recorded as a data bit being transmitted. Additionally, the secondary circuit can be phase shifted at the following zero voltage crossing in the same way as the primary to bring it back in phase with the primary. This allows data transfer with minimal disruption to power transfer.

Advantages of RPSK

The key advantages of RPSK include:
1. Higher data transfer rates: One data bit can be transferred in one cycle of the primary power carrier. This is independent of the primary pickup quality factor. The same is not true for any other method. One other method has been known to transfer data in a way that is independent of the primary quality factor but that method requires multiple carrier cycles to get reliable data transmission.
2. Less disruption to power transfer: As the primary now destructively interferes with the secondary voltage, the change in secondary resonant voltage is faster compared with amplitude-shift-keying and can be detected in fewer cycles. This leads to higher data transfer rates.

Furthermore, because the change in secondary resonant voltage is detected in fewer cycles compared with other methods and the secondary voltage is shifted by 180 degrees to re-align with the primary current, power transfer from the primary to secondary is less affected by data transmission compared with other methods.

Technical Problems Solved by RPSK
1. Data transfer rate from primary to secondary is a limit to a range of applications. RPSK can give higher data-rates than are possible with ASK.
2. With RPSK, the applications requiring a data transfer link separate to the wireless power transfer to get high enough data transfer rates would be able to use just the wireless power link.
3. Applications where the disruption to power transfer from ASK are not acceptable could use downlink-RPSK.
4. Current phase shift keying methods to transfer data from the primary to the secondary require many resonant cycles to flip the primary phase and use more energy doing so.

They also require the secondary resonant voltage to go to zero and then re-build each data byte that is transferred which takes multiple resonant cycles and disrupts power transfer while the resonant voltage rebuilds. Downlink-RPSK with secondary-phase-correction requires no more than one resonant cycle for at the primary and the secondary. It also disrupts power transfer much less significantly.

RPSK Power Requirements

The energy per bit required to maintain oscillations with amplitude V2 at the secondary is, $$E_{b_{tx}} = \frac{V_2^2}{2R_2} \cdot \frac{1}{1+Q_2^2} \cdot \frac{N_c}{f_c}, \tag{1}$$

where R2 is the secondary coil ESR, Q2 is the secondary coil quality factor, Nc is the number of carrier cycles per bit and fc is the carrier frequency. The inductive link parameters for the RPSK system are presented in the Table 1.

TABLE 1

| Inductive Link Parameters | |
|---|---|
| Carrier frequency | 6.78 MHz |
| Primary coil | 15 cm diameter coil made from 5 tuns of litz cable with 1100 strands of 48 awg wire |
| $L_1$ | 10 µH |
| $C_1$ | 55 pF |
| $R_1$ | 0.1 Ω |
| Secondary coil | 71 µm diameter copper wire, 12 turn solenoid, circular dimensions equivalent to 2.2 mm by 16 mm rectangle |
| $L_2$ | 2.25 µH |
| $C_2$ | 245 pF |
| $R_2$ | 2.5 Ω |

The voltage amplitude induced at the primary from oscillations in the secondary determines the probability of error at the receiver. Therefore, the power required to maintain oscillations in the secondary is analysed in terms of the open circuit voltage induced at the primary. The voltage induced in a primary pickup with inductance $L_1$ by peak-to-peak current $I_2$ in a secondary pickup with inductance $L_2$ having mutual inductance M or coupling k is, $$V_1 = j\omega M I_2 = j\omega k \sqrt{L_1 L_2} I_2. \quad (2)$$

The power lost in the secondary while maintaining a constant current is, $$P_{R_2} = \frac{|I_2|^R R_2}{2}. \quad (3)$$

Therefore, the secondary power can be stated in terms of the primary voltage, $$P_{R_2} = \frac{V_1^2 R_2}{2\omega^2 k^2 L_1 L_2} = \frac{V_1^2}{2\omega k^2 L_1 Q_2}. \quad (4)$$

When $N_c$ carrier cycles are used per bit, the energy per bit at the secondary to achieve a voltage $V_1$ at the primary is, $$E_{b_{tx}} = \frac{|V_1|^2}{2\omega k^2 L_1 Q_2} \frac{N_C}{f_c}. \quad (5)$$

The power required to provide a given induced voltage at the primary is inversely proportional to the secondary pickup quality factor. Rearranging gives the voltage induced at the primary for a given power dissipation:

$$V_1 = k\sqrt{2\omega L_1 Q_2 P_{R_2}} = k\omega\sqrt{\frac{2L_1 L_2 P_{R_2}}{R_2}}. \quad (6)$$

The power required to maintain voltage $V_1$ decreases linearly with frequency and clearly a secondary coil with lower ESR and higher inductance is preferable. During phase shifts the secondary pickup is reduced to an inductor in series with the ESR $R_2$ and the switch resistance $R_{SW}$. The current though $L_2$ is, $$I_{L_2} = I_{peak} e^{-\frac{R_s}{L_2} t}, \quad (7)$$

where $R_S = R_2 + R_{SW}$.

The percentage current loss after shorting for half the carrier period is, $$I_{loss} = \left(1 - e^{-\frac{R_S}{2f_c L_2}}\right) \times 100\% = \left(1 - e^{-\frac{\pi}{Q_{short}}}\right) \times 100\%. \quad (8)$$

The energy per bit required to produce 100 μV with a coupling of 0.1, 0.01 and 0.001 at the primary is shown in FIG. 12 for the coil parameters in Table 1 where $N_c$=10 and the energy loss from phase shifts is neglected.

Comparison of RPSK with IR Modulation

In RPSK, data is fundamentally encodes as a BPSK signal and hence, in the presence of white noise having noise spectral density $N_0/2$, the probability of bit error when using coherent detection is.

$$P_e = Q\left(\sqrt{\frac{2E_{b-RPSK}}{N_0}}\right), \quad (9)$$

where Q is the Q-function, $E_{b-rx}$ is the energy per bit at the receiver and $N_0$ is the noise spectral density. IR is fundamentally a form of amplitude modulation and has a probability of bit error, $$P_e = Q\left(\sqrt{\frac{E_{b-IR}}{N_0}}\right), \quad (10)$$

when a matched filter is used at the receiver. $E_{b-rx}$ is the energy per bit "one" and equation accounts for the energy per "zero" bit being zero. For both RPSK and IR the signal energy per bit at the receiver is, $$E_{b-rx} = \int_0^{T_b} V_1^2(t)dt = \int_0^{T_b} -\omega^2 M^2 I_2^2(t)dt, \quad (11)$$

and, because $P_{rx}(t) = I_2^2(t)R_2$ and $E_{b-rx} = \int_0^{T_b} I_2^2(t)R_2 dt$ (11) can be rearranged to give, $$E_{b-rx} = \frac{\omega^2 M^2 E_{b-tx}}{R_2}. \quad (12)$$

Assuming the bit period in the IR method contains most of the signal energy which must be the case to avoid ISI, the performance of RPSK can now be compared with the impulse response (IR) method or alternately other AM based methods directly. To reach equal probability of bit error (9) the foregoing can be rearranged to show, $$E_{b_{RPSK}} = \frac{E_{b_{IR}}}{2}. \quad (13)$$

Theoretically, RPSK requires half the energy required by IR to achieve the same probability of bit error. Now, comparing the achievable data rate though RPSK and IR, the fundamental limit for data rate in RPSK depends on the number of carrier cycles chosen to represent a bit and is independent of $Q_2$ or the parameters of $L_2$. In contrast, the data rate in IR is dependent on $L_2$ and $R_2$.

Data rate for IR can be increased by using PHM or SPHM. This reduces the energy per bit at receiving primary but does not reduce the energy cost to generate the bit at the secondary. In practise, the precise switching required for RPSK limits the maximum frequency of operation to a few tens of MHz whereas IR can be run at hundreds of MHz achieving much higher data rates. Weather RPSK or IR is preferable will depend on the coupling, wireless power operating frequency, power requirements and required data rates of the application.

RPSK Transmitter Implementation

Due to the precise timing and low power requirements of RPSK, an ASIC 10 was designed to demonstrate its performance. The RPSK ASIC system architecture with Right hand pins 11 of the ASIC connecting to a microcontroller is shown in FIG. 13. The embodiment shown in FIG. 13 depicts the instance of a sequential RPSK technique on a pick-up 2 which receives power from a primary 1 having a primary driver 20 and demodulator 6. FIGS. 24 and 25 depict the embodiments of multi-coil RPSK and Downlink RPSK (Primary to Secondary) techniques, respectively. The implementation of these embodiments is described below.

An oscillator 12 is used to drive the RF carrier in the secondary LC pickup at its natural resonant frequency. The amplitude peak of the oscillating voltage is monitored by monitor 16 and energy is injected only when the peak falls below threshold $V_{th}$. This keeps the oscillator 12 off during wireless power transfer. It also allows the oscillator 12 to drive a range of different coils and at different resonant frequencies. A clock generator 13 extracts a clock from the RF carrier which is used for timing and digital control. A counter 14 counts ten periods and if data is present on the Data input at the tenth cycle the phase is shifted 180 degrees. The phase shift is created by shorting the secondary pickup with the oscillator switches for precisely half of the RF carrier period. Timing for the start of a phase shift is taken from the clock extractor on the tenth rising edge.

The clock remains high and the RF carrier voltage at zero during a phase-shift. To generate precise timing for the end of a phase-shift, a delay-lock-loop 15 (DLL) which produces both a 180 degree delayed clock and a 90 degree delayed clock is used. The 180 degree delay ensures that a dock edge is present to end the phase-shift after precisely half a carrier period. The 90 degree phase shift is used by a regenerative latch to compare the oscillating voltage peak with a reference to monitor the amplitude cycle by cycle and determine if the oscillator should inject additional energy into the secondary. On the tenth carrier cycle, count 10 is pulled high and the falling edge is used to inform a micro that the next data bit should be shifted onto the Data line. When all data is transferred, a micro can pull the End data bit high and disable the RPSK ASIC. An on board bandgap reference generates voltage and current biases for the ASIC. The data transfer sequence with RPSK is shown in FIG. 14. FIG. 14 depicts four carrier cycles per bit for clarity. However, in practice at least 10 cycles per bit and above may be used.

Oscillator & Phase-Shift Circuitry

An example of an oscillator 12 and phase shift circuit as used in one of the embodiments of the present disclosure is shown in FIG. 15. The oscillator, shown in FIG. 15, is implemented using a structure similar to the traditional cross coupled oscillator. The current mirror formed by M1 and M7 though M11 drives the secondary pickup with current 1001b though P1 and P2. $V_{osc+}$ and $V_{osc-}$ are enabled by the regenerative latch when the resonant voltage is below 2V allowing for moderate variation in the pickup parameters and drive current due to device mismatch. The clock generator determines the timing for $V_{osc+}$ and $V_{osc-}$ to ensure only one is on and they are only turned on and off at the zero voltage crossings. $V_{g\_M5}$ and $V_{g\_M6}$ are typically cross coupled to $V_{coil-}$ and $V_{coil+}$ respectively. On phase shifts, $V_{osc+}$ and $V_{osc-}$ are both pulled Ihigh. $V_{short+}$ and $V_{short-}$ are also pulled high shorting $V_{coil+}$ to $V_{coil-}$ though M5 and M6.

Clock Generator

A clock generator 13 or a comparator as used in an embodiment is disclosed in FIG. 16. The comparator of FIG. 16 uses a modified version of the common gate structure from [17]. The gate source voltage of M16 is biased by the current source M3 such that the current though M15 and M16 are equal to $I_b$ when $V_{coil+}$ and $V_{coil-}$ are equal. Because the current though M15 is not constrained, when $V_{coil-}$ goes below $V_{coil+}$, it can discharge all parasitic capacitance at $V_0$ extremely quickly. The half circuit made up of M15, M6, M12 and M13 works in the opposite direction charging $V_0$ when $V_{coil+}$ goes below $V_{coil-}$. In previous implementations, the current though M5 is unconstrained when $V_0$ is positive and there is a large static current draw. Here, a switch M9 is turned off by $V_{C2}$ preventing this large current and switch M8 is opened allowing bias current $I_b$ to keep $V_{C2}$ high until $V_{coil-}$ returns back below $V_{coil+}$. At 6.78 MHz, with 3V supply and differential 2V sinusoidal inputs to $V_{coil+}$ and $V_{coil-}$, the comparator has high-to-low delay and low-to-high delay of 2.6 nS and 3.6 nS respectively and uses 126 µA when simulated post-layout.

Delay-Lock-Loop

An example implementation of a delay-lock-loop (DLL) is shown in the form of a block diagram in FIG. 17. The DLL of FIG. 17 consists of a voltage controlled delay line 21 (VCDL), charge pump 22 and phase detector 23. The clock from the clock generator runs though the VCDL and is delayed based on the control voltage from the charge pump. The output clock is compared to the reference clock in the phase detector. If the DLL clock is less than 180 degrees behind the reference clock, the phase detector outputs a low pulse and the charge pump decreases the control voltage delaying the DLL clock further. Conversely, the control voltage is increased and the delay shorten if the DLL clock is more than 180 degrees behind the reference clock.

An example of a VCDL 21 structure consisting of two identical branches in series is shown in FIG. 18. The VCDL structure as shown in FIG. 18 consists of two stages of four current starved inverters with tapered buffers at the output. The tapered buffers are used to sharpen up the edges for the DLL output clocks. Due to the slow switching of the current starved inverters, very small inverters are used at the start of the tapered buffers to minimise current though the inverter during the high-to-low and low-to-high transitions. The end point of the VCDL is compared to the reference clock to create a 180 degree phase delay. By keeping the two sides of the VCDL symmetric the centre point can be used to generate a 90 degree delayed clock.

An example implementation of a current starved inverter as delay element for VCDL 21 is shown in FIG. 19a. In this implementation, M2 and M3 bias the current in the inverter and prevent charge injected by M1 and M4 from flowing through to the output. The control voltage sets the current and delay in the delay elements though the bias circuit as shown in FIG. 19b. Here, M2 and M7 are sized to match M1 and M4 from the delay element and improve current matching between the bias circuit and delay elements.

An example of the phase detector as used in an embodiment is shown in FIG. 19c. This phase detector uses FF2, FF3 and A1 to compare the rising edges of the reference clock and DLL output clock [18]. If the reference clock is ahead of the DLL clock $Q_A$ is high for the time difference. If the reference clock is behind the DLL clock $Q_B$ is high for the time difference. $Q_A$ and $Q_B$ are used as control signals to the charge pump adjusting the control voltage until delay is correct and both rising edges occur at the same time.

The VCDL is initialised with minimum delay, such that the reference clock rising edge is slightly ahead of the DLL clock. To prevent false locking on zero delay, the first rising edge of the reference clock is ignored. This allows the phase detector to detect the DLL clock rising edge first and hence start delaying it to match the second reference clock edge. FF1 is used to ignore the first rising edge of the reference clock. Initially Q of FF1 is low so a rising edge on $V_{LCK\_N}$ does not change the state of FF2. The first rising edge of the reference dock forces Q of FF1 to go high and the phase detector then operates normally. INIT is used to initialise the phase detector state. The DLL also includes a circuit to detect when the DLL clock is within 8 ns of the reference clock indicating the DLL has locked.

An instance of the implementation of a charge pump 22 for the DLL of the present invention is shown in FIG. 20. The charge pump in FIG. 20 uses a high swing current mirror which works down to supply voltages of 2 Vt+3 Vov, below 2V in this implementation. The charge pump voltage can go as low as 2 Vov and as high as Vdd−2 Vov. Current steering is used to minimise charging of parasitic capacitance at the output nodes. A unity gain buffer is employed to hold the voltage at the current steering nodes to the output voltage further reducing charging of parasitics. Finally, dummy switches are used at the charge pump output to cancel charge injection from the current steering switches.

It is observed from the post-layout simulation that, the DLL takes approximately 15 ps to lock the 180 degree clock within 1 ns of the reference, draws 150 µW and has a final lock error of −530 pS for the 180 degree clock and 380 ps for the 90 degree clock when operating at 6.78 MHz.

Regenerative Latch

In an embodiment, the oscillator 12 is controlled by monitoring the peak oscillator voltage and driving the oscillator when this voltage falls below 2V. The voltage monitor combines a high-speed, low-kickback regenerative latch 24 with the 90 degree phase shifted clock from the DLL. The DLL 180 degree clock is locked with the oscillator zero voltage crossings and hence the 90 degree clock is locked with the voltage peaks. An example of a low kickback regenerative latch is show in FIG. 21. The latch according to this example, has a 2 nS delay between the clock and output rising edges and uses 7.6 µW at 6.78 MHz simulated post-layout with 3V supply.

Bandgap Circuit

The bandgap circuit 25 uses a cascade-type structure with the high-swing current mirrors that minimise mismatch due to channel length modulation. A small modification such that M9 though M12 use one unit device and the remaining transistors us two unit devices in parallel creates the same bias voltages while simplifying matching. The current mirror structure ensures the overdrive voltage $V_{ov}$ for M3, M5 and M7 are equal and M14, M16 and M18 are equal reducing current mirror error due to finite MOS output resistance. The structure also allows the bandgap circuit to work down to voltages of, $$V_{DD}=|V_{tp}|+2|V_{ovp}|+2V_{own}+V_{BB2}. \tag{13}$$

M19 and M20 are used to initiate the bandgap reference circuit. In this implementation the bandgap works down to 2V with an output of 1.1V. It has a 3.6 mV rise in bias with supply from 2V to 3.3V draws 11 uW at 3V post-layout. A 500 point 3 sigma monte-carlo run indicates a standard deviation of 18 mV in output bias voltage with combined process variation and device mismatch. An instance of the Bandgap voltage reference for on-chip bias voltages and currents is depicted in FIG. 22.

BPSK Receiver Details

The receiver contains the following systems.

Antenna 30: this could be the same coil that the RPSK system transmits on, a second coil, or the same coil that transmits power to the implantable device.

Input band pass filtering 31: this could be a LC or other passive filter having acceptable group delay such as a 2nd order Butterworth filter. If noise was low, this could be left out.

Automatic gain control 32: this could be a closed loop error amplifier with P, PI, or equivalent control systems which compares the signal to a reference level. The input from the antenna or bandpass filter is then amplified by a variable gain amplifier controlled by the error amplifier signal. In this way, the receiver has a large dynamic range to allow data recovery from small or large signals as encountered with wide coupling range signals such as those due to movement of the antennas with respect to each other.

Signal level detector: to transform the input signal into a dc equivalent value for comparison to the refence level in order to determine the gain required to drive the recovery circuits at the right level. This could be a RF to RMS detector, rectifier and filter or other envelope detector.

Carrier recovery sub system 33: a phase lock loop that compares the amplified signal to a reference clock from a VCO and generates a phase error signal. The error signal being used to control the oscillator in order to lock the reference clock to the incoming signal. The vco could be a quadrature vco for use in the IQ demodulator.

IQ demodulator 34: A costas loop which multiplies the reference signal with the sin and cos outputs from the quadrature vco, filters each multiplicand to give I and Q, multiplies the filtered signals together and integrates them and applies the result to the VCO control to form a closed loop recovery system.

Symbol recovery sub system 35: A threshold detector which changes state when the I and Q crosses a threshold to give a signal appropriate for connecting to a cpu or other logic system. Such a system could be made from analog integrated circuits, on chip in an IC, on an FPGA or in a software defined radio system. An example is shown in FIG. 22a.

Receiver power transfer system: A coil of approximately 15 cm across, which is energised by a alternating current source at 8.78 MHz to power the implant. The alternating current is turned off and the magnetic energy allowed to dissipate. The coil is then connected to the bandpass filter inputs to form the antenna in the receiver circuit above. The coil remains connected to the receiver while the data is being received. The receiver is then disconnected from the coil, and power transfer re-established till more data is ready. Alternately, a separate coil could be used to form the antenna. This has the advantage of reducing the input voltage from the wireless power transfer system into the receiver to make the system more robust. This could be designed such that it couples to the remote transmitter, but does not couple to the power transfer coil. This also allows the data and power transfer systems to operate at the same time.

RPSK Spectrum Vs Traditional BPSK Spectrum

The power spectral densities of a binary-RPSK signal vs a traditional BPSK signal for a carrier frequency of 6.78 MHz and a symbol rate of 680 KHz (10 carrier periods per symbol) are depicted in FIG. 23. A skilled addressee will appreciate from this implementation that BRPSK places more power lower side lobes and side lobes above 14 MHz compared with BPSK. The main lobe containing the signal has negligible difference in power spectral density indicating the RPSK signal can be filtered and detected using typical demodulators for BPSK.

FIG. 24 depicts another example implementation of the RPSK ASIC system architecture using multiple coils (Multi-coil RPSK). First coils L1 and L2 provide power transfer. The second set of coils L3 and L3 allow data transfer.

FIG. 25 depicts an implementation of downlink RPSK ASIC system architecture that is configured to send and receive data and energy between the primary (associated with coil L1) and the secondary (associated with coil L2) of the system.

Simulation results have shown that, not only does the disclosed system have the ability to transfer the data at very low coupling conditions, it also provides a higher data rate than offered by other IR techniques with lower power, which is lacking in existing direct WPT systems. As such, the current invention proposes a new form of control for IPT systems, or IPT primary power supplies, in which discrete energy injection is used to control the primary power controller and thus control the IPT system as required. In particular, energy injection according to the present invention allows the power available to one or more pick-ups.

Consequently, the present RPSK design overcomes problems of the existing uplink data transfer systems by using a unique design and control strategy that can:
  i. use precisely timed shorting or opening of the primary inductor to change the resonant phase of the primary current allowing high data transfer rates,
  ii. detect the phase change at the primary as a drop in the secondary resonant voltage, and
  iii. use precisely timed shorting or opening or the secondary inductor to re-align the secondary voltage and primary current phases such than power transfer is only briefly disrupted and allowing high data transfer rates.

Alternately, for Downlink-based transfer systems the present RPSK design overcomes problems over existing techniques by using a unique design and control strategy that can:
  i. use precisely timed shorting or opening of the primary inductor to change the resonant phase of the primary current allowing high data transfer rates,
  ii. run the primary at the new phase for a set number of cycles,
  iii. after the set number of cycles have passed, use precisely timed shorting or opening of the primary inductor to revert the primary current phase to its original position,
  iv. detect the primary phase change as a dip in secondary resonant voltage, and
  v. use the voltage dip as a method to transfer data from the primary to the secondary.

Therefore, it will be evident for a skilled addressee that further extensions of the current RPSK techniques provide a new design and control method that can:
  i. use the size of the resonant voltage dip at the secondary to infer how many carrier cycles the phase has remained shifted for and using this as a method to transfer multiple data bits at once, and
  ii. use the size of the voltage dip to infer the phase angle change at the primary and use the multiple phase angle changes at the primary to transfer multiple bits.

Furthermore, from the above disclosure of the IPSK and RPSK embodiments, it will also be evident to a skilled addressee that:
  i. the change in phase results in no loss of energy stored in the primary resonant tank other than the losses in the coil resistance and shorting switch resistance,
  ii. the change in phase can be detected simply as an amplitude change in the secondary resonant voltage, and
  iii. the phase of the secondary voltage can be realigned with the primary current within one carrier cycle.

Consequently, these techniques have applications in many implantable devices which could benefit from the higher data rate and lower disruption to power transfer offered by downlink-RPSK with secondary-phase-correction. The current invention also enables for providing single coil implantable devices that are not currently possible with existing techniques. In addition the current techniques could also improve or enable a range of consumer applications such as wireless phone charging, wireless communication, etc.

In another embodiment the current invention also discloses a method of measuring compartmental pressure within the body from a long term implantable device. The device is said to comprise a pressure sensor physically able to measure pressure though a hermetic housing. An inductive link for power transfer from an external reader to an implanted device is provided and the same inductive link can be used for transmitting data from the implanted device to the external reader. In another aspect, a method of wirelessly communicating between the external reader and an implanted power and data unit is also presented. In this implementation an inductor, an arbitrary resonant tuning network, a switch in parallel with the inductor and an arbitrary driving circuit are used as a means of generating and maintaining an oscillating voltage and current within the pickup. Phase shifts in the system are introduced by short circuiting the inductor at the maximum current, zero voltage crossing for a fraction (or multiple whole periods and a fraction) of the resonant period. The fraction of the resonant period may determine the size of the phase shift and phase shifts encode the data In a further embodiment a sealed hermetic capsule containing the pressure sensor and wireless power and data electronics which can be delivered to an internal organ is provided. In an implementation, the pickup coil receives power from an external device for a period of time, then the implant transmits data during a second period to the external device. A plurality of coils may be used to receive power and communicate data simultaneously in this implementation.

Other applications of the present techniques include, but not limited to:
  i. implantable devices with only one coil requiring high downlink data transfer rates,
  ii. implantable devices with only one coil requiring data transfer with minimal disruption to power transfer,
  iii. consumer devices requiring higher data transfer rates and lower power disruption than other methods,
  iv. RFID tags requiring higher data rates from the reader to the tag than offered by ASK.

What is disclosed is a method of transferring data from a wireless power transfer primary to a wireless power transfer secondary using phase-shift-keying generated though precisely timed shorting of the resonant pickup inductor at zero-voltage crossings or open-circuiting of the resonant pickup capacitor at maximum voltage crossings is also presented.

Throughout the description like reference numerals will be used to refer to like features in different embodiments.

The terms "inductive power transfer" can be substituted with "transcutaneous energy transfer" which is commonly used terminology when referring to powering of implanted medical devices.

The entire disclosures of all applications, patents and publications cited above and below, if any, are herein incorporated by reference. Any discussion of the prior art throughout the specification should in no way be considered as an admission that such prior art is widely known or forms part of common general knowledge in the field.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A wireless power and data transfer system comprising:
   a wireless power transfer primary apparatus comprising:
      a primary power transfer apparatus having a primary resonant circuit;
      a primary controller configured to transfer power in a first interval; and
      a phase detector operable by the primary controller to decode data in a second interval, subsequent to the first interval, in which the primary resonant circuit is not transferring power; and
   a wireless power transfer pick up comprising:
      a pick-up resonant circuit comprising an inductor and a capacitor configured to receive power wirelessly from the primary resonant circuit;
      an energy storage element configured to store energy received by the pick-up resonant circuit;
      a driving circuit connected to the pick-up resonant circuit to drive a resonant current and voltage in the pick-up resonant circuit;
      a switch connected to the resonant circuit; and
      a phase modulator configured to activate and deactivate the switch to encode data through phase modulation of the resonant voltage or current for detection by the phase detector, the phase modulator being configured to activate the switch to either:
         i) short circuit the inductor at maximum current in the inductor and zero voltage across the capacitor, or
         ii) open circuit the capacitor at maximum voltage across the capacitor and zero current in the inductor,
      for a first time period comprising a fraction of a resonant cycle of the resonant current and voltage to create a phase shift in the resonant current and voltage whereby the resonant current and voltage has a new phase, and the phase modulator being configured to deactivate the switch after the first time period has elapsed to maintain the resonant current and voltage at the new phase, and wait for a second period of time corresponding to a plurality of cycles of the resonant current and voltage to elapse before reactivating the switch;
      a sensor operable to sense a resonant voltage of the pick-up resonant circuit; and
      a pick-up controller configured to compare the resonant voltage with a threshold and disable the driving circuit and phase modulator if the resonant voltage is greater than the threshold and enable the driving circuit and phase modulator if the resonant voltage is less than the threshold.

2. The wireless power and data transfer system as claimed in claim 1, wherein the wireless power and data transfer system further comprises a further resonant circuit configured to receive power wirelessly.

3. The wireless power and data transfer system as claimed in claim 1, wherein the phase modulator activates and deactivates the switch to transmit data in a form of binary phase shift keying (BPSK), or quadrature phase shift keying (QPSK).

4. An implantable device comprising the wireless power and data transfer system of claim 1 provided in a hermetic housing.

5. The implantable device of claim 4, further comprising a pressure sensor configured to measure pressure through the hermetic housing.

6. The implantable device of claim 5, wherein the pressure sensor is connected to the pick-up resonant circuit or the energy storage element to receive power from the pick-up resonant circuit.

7. The implantable device of claim 4, wherein the wireless power and data transfer system is configured to supply power transcutaneously.

8. The implantable device of claim 4, wherein the wireless power and data transfer system is configured to operate with a coupling factor of 0.01.

9. The system of claim 1, wherein the first time period comprises a fraction of a resonant cycle that is less than a full resonant cycle.

10. A method of controlling a wireless power and data transfer system having a primary apparatus comprising a primary resonant circuit and a phase detector and a pick-up having a resonant circuit comprising an inductor and a capacitor to phase modulate a current and voltage of the resonant circuit to encode data, the method comprising:
   operating the primary resonant circuit to transfer power to a pick-up resonant circuit in a first interval;
   storing energy received by the pick-up resonant circuit in the first interval;
   stopping power transfer from the primary resonant circuit at an end of the first interval;
   in a second interval subsequent to the first interval, during which power is not being transmitted from the primary resonant circuit, controlling a driving circuit connected to the resonant circuit to supply energy from an energy storage element to the pick-up resonant circuit to drive a resonant current and voltage in the resonant circuit;
   controlling a phase modulator configured to activate and deactivate a switch connected to the resonant circuit to encode data through phase modulation of the resonant voltage or current for detection by the primary apparatus, by controlling the phase modulator to activate the switch to either:
      i) short circuit the inductor at maximum current in the inductor and zero voltage across the capacitor, or
      ii) open circuit the capacitor at maximum voltage across the capacitor and zero current in the inductor;

for a first time period comprising a fraction of a resonant cycle of the resonant current and voltage to create a phase shift in the resonant current and voltage whereby the resonant current and voltage has a new phase, and controlling the phase modulator to deactivate the switch after the first time period has elapsed to maintain the resonant current and voltage at the new phase, and wait for a second period of time corresponding to a plurality of cycles of the resonant current and voltage to elapse before reactivating the switch; and detecting the phase shift, by a phase detector of the primary apparatus.

11. The method of claim 10, wherein the first time period comprises a fraction of a resonant cycle that is less than a full resonant cycle.

12. The method of claim 10, further comprising controlling the phase modulator to activate and deactivate the switch to transmit data in a form of binary phase shift keying (BPSK), or quadrature phase shift keying (QPSK).

13. The method of claim 10, further comprising controlling the driving circuit to inject energy into the pick-up resonant circuit when a voltage of the pick-up resonant circuit falls below a threshold.

* * * * *